US 8,845,800 B2

(12) United States Patent
Gotou et al.

(10) Patent No.: US 8,845,800 B2
(45) Date of Patent: Sep. 30, 2014

(54) IMAGE FORMING METHOD

(71) Applicants: Hiroshi Gotou, Kanagawa (JP); Hidetoshi Fujii, Kanagawa (JP); Yuuki Yokohama, Kanagawa (JP)

(72) Inventors: Hiroshi Gotou, Kanagawa (JP); Hidetoshi Fujii, Kanagawa (JP); Yuuki Yokohama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 85 days.

(21) Appl. No.: 13/680,386

(22) Filed: Nov. 19, 2012

(65) Prior Publication Data

US 2013/0155145 A1 Jun. 20, 2013

(30) Foreign Application Priority Data

Dec. 14, 2011 (JP) .................................. 2011-273883

(51) Int. Cl.
*C09D 11/02* (2014.01)
*B41J 2/015* (2006.01)
*B41M 5/50* (2006.01)
*C09D 11/30* (2014.01)
*B41M 5/00* (2006.01)

(52) U.S. Cl.
CPC ............... *B41J 2/015* (2013.01); *B41M 5/0017* (2013.01); *C09D 11/30* (2013.01)
USPC .................. 106/31.43; 106/31.58; 106/31.75; 106/31.86; 347/21

(58) Field of Classification Search
CPC ...... C09D 11/30; C09D 11/322; C09D 11/54; B41J 2/015; B41M 5/0017
USPC ......... 106/31.43, 31.58, 31.75, 31.86; 347/21
See application file for complete search history.

(56) References Cited

U.S. PATENT DOCUMENTS

| 5,224,987 | A | * | 7/1993 | Matrick ...................... 106/31.43 |
| 8,721,034 | B2 | * | 5/2014 | Yokohama et al. ............. 347/20 |
| 2005/0225618 | A1 | | 10/2005 | Askeland et al. |
| 2005/0243121 | A1 | | 11/2005 | Onishi |
| 2007/0197685 | A1 | | 8/2007 | Aruga et al. |
| 2008/0233363 | A1 | | 9/2008 | Goto |

(Continued)

FOREIGN PATENT DOCUMENTS

| CN | 101531089 | 9/2009 |
| CN | 101541549 | 9/2009 |

(Continued)

OTHER PUBLICATIONS

English translation of JP 2012/107210; Jun. 2012.*

(Continued)

*Primary Examiner* — Helene Klemanski
(74) *Attorney, Agent, or Firm* — Oblon, Spivak, McClelland, Maier & Neustadt, L.L.P.

(57) ABSTRACT

An image forming method applying a pretreatment liquid on the surface of a recording medium; and applying an inkjet ink including a colorant, a hydrosoluble organic solvent, a surfactant and water on the surface applied with the pretreatment liquid, wherein the hydrosoluble organic solvent includes at least one polyol including an equilibrium water content in an amount not less than 30% by weight at 23° C. and 80% RH; an amide compound having the following formula (I); and at least one of compounds having the following formulae (II) to (IV), and wherein a pure water transfers to the recording medium in an amount of from 1 to 15 mL/m$^2$ when measured by a dynamic scanning liquid absorptometer at a contact time of 100 ms.

9 Claims, 1 Drawing Sheet

(56) References Cited

U.S. PATENT DOCUMENTS

| | | |
|---|---|---|
| 2008/0257207 A1 | 10/2008 | Rengaswamy et al. |
| 2009/0041940 A1 | 2/2009 | Yokohama et al. |
| 2009/0043028 A1 | 2/2009 | Matsuyama et al. |
| 2009/0047431 A1 | 2/2009 | Hatada et al. |
| 2009/0098312 A1 | 4/2009 | Goto et al. |
| 2009/0176070 A1 | 7/2009 | Goto et al. |
| 2009/0233068 A1 | 9/2009 | Irita |
| 2009/0258196 A1 | 10/2009 | Nagashima et al. |
| 2010/0112219 A1 | 5/2010 | Yokohama et al. |
| 2010/0196601 A1 | 8/2010 | Goto et al. |
| 2010/0196602 A1 | 8/2010 | Koyano et al. |
| 2010/0295891 A1 | 11/2010 | Goto et al. |
| 2011/0057981 A1 | 3/2011 | Aruga et al. |
| 2011/0164086 A1 | 7/2011 | Ggoto et al. |
| 2011/0205288 A1 | 8/2011 | Matsuyama et al. |
| 2011/0292114 A1* | 12/2011 | Sao et al. ................. 106/31.58 |
| 2011/0310166 A1 | 12/2011 | Namba et al. |
| 2012/0098883 A1 | 4/2012 | Matsuyama et al. |
| 2012/0128949 A1 | 5/2012 | Goto |
| 2012/0207983 A1 | 8/2012 | Matsuyama et al. |
| 2012/0262517 A1 | 10/2012 | Takaku et al. |
| 2013/0002776 A1* | 1/2013 | Nagashima et al. .......... 347/100 |
| 2013/0071637 A1* | 3/2013 | Matsuyama et al. ........... 347/20 |
| 2013/0113860 A1* | 5/2013 | Gotou et al. .................. 347/20 |
| 2013/0176369 A1* | 7/2013 | Gotou et al. ................. 347/100 |
| 2013/0194344 A1* | 8/2013 | Yokohama et al. ............. 347/20 |
| 2013/0323474 A1* | 12/2013 | Gotou et al. ............... 428/195.1 |
| 2014/0002539 A1* | 1/2014 | Goto et al. ................ 106/31.75 |
| 2014/0017461 A1* | 1/2014 | Matsuyama ............... 106/31.77 |
| 2014/0072779 A1* | 3/2014 | Matsuyama et al. ....... 106/31.77 |

FOREIGN PATENT DOCUMENTS

| | | | |
|---|---|---|---|
| CN | 101663364 | | 3/2010 |
| CN | 101909898 | | 12/2010 |
| EP | 2 511 351 A1 | | 10/2012 |
| JP | 62-84171 | | 4/1987 |
| JP | 2004-136458 | | 5/2004 |
| JP | 2008-018711 | | 1/2008 |
| JP | 2008/163238 | * | 7/2008 |
| JP | 2009-052018 | | 3/2009 |
| JP | 2009-287014 | | 12/2009 |
| JP | 2010-180332 | | 8/2010 |
| JP | 2012/107210 | * | 6/2012 |

OTHER PUBLICATIONS

English translation of JP 2008/163238; Jul. 2008.*

Extended European Search Report issued Mar. 26, 2013, in Patent Application No. 12195625.4.

Eva Garcia, et al., "New Class of Acetal Derived from Glycerin as a Biodiesel Fuel Component", Energy & Fuels, vol. 22, No. 6, XP 055054852, Nov. 19, 2008, pp. 4274-4280.

U.S. Appl. No. 13/494,222, filed Jun. 12, 2012, Hidefumi Nagashima, et al.

U.S. Appl. No. 13/683,000, filed Nov. 21, 2012, Gotou, et al.

U.S. Appl. No. 13/606,075, filed Sep. 7, 2012, Fujii, et al.

Chinese Office Action issued May 23, 2014, in corresponding Chinese Patent Application No. 201210541429.2.

* cited by examiner

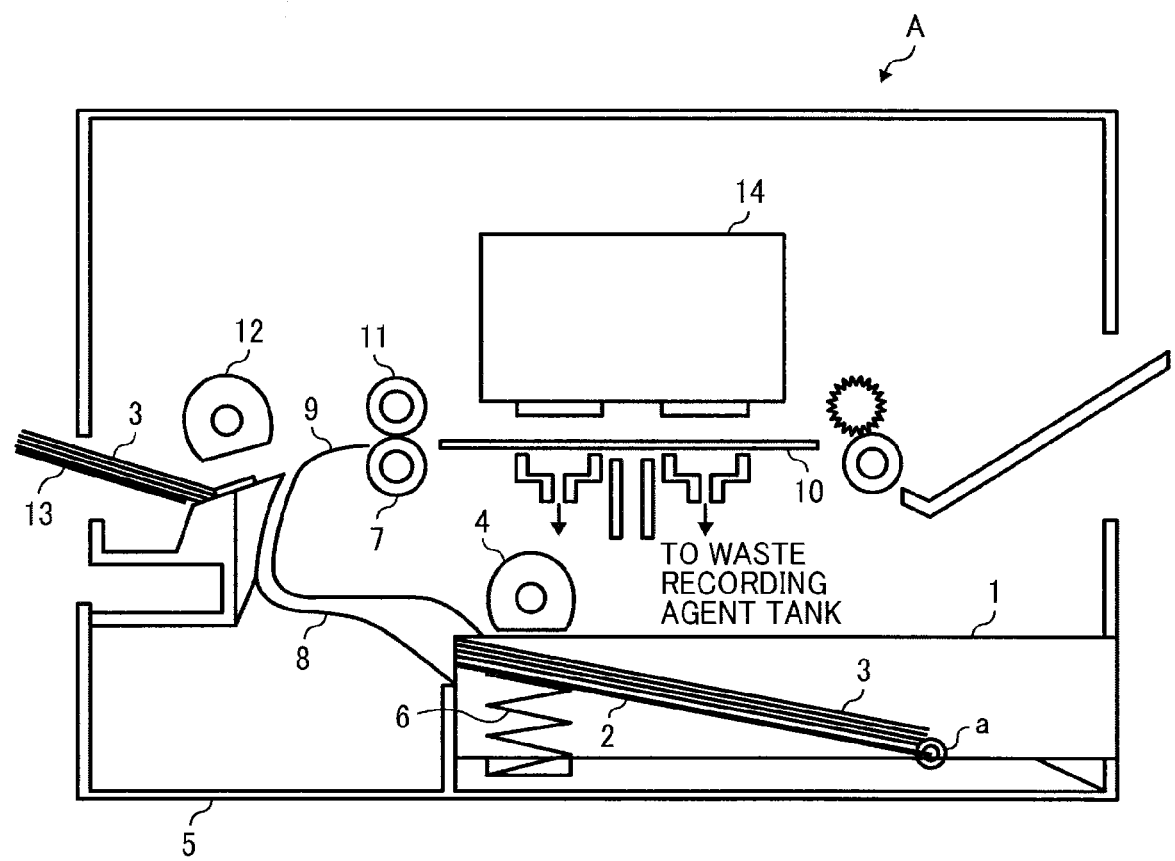

IMAGE FORMING METHOD

CROSS-REFERENCE TO RELATED APPLICATIONS

This patent application is based on and claims priority pursuant to 35 U.S.C. §119 to Japanese Patent Application No. 2011-273883 filed on Dec. 14, 2011, in the Japanese Patent Office, the entire disclosure of which is hereby incorporated herein by reference.

FIELD OF THE INVENTION

The present invention relates to an image forming method having a pretreatment process and an image forming process.

BACKGROUND OF THE INVENTION

A water pigment inkjet ink has less bleeding, high image density and less coming out from the back when printed on a plain paper.

However, when a picture or a drawing needing much ink when printed on a plain paper is printed thereon, the plain paper is likely to curl back (the paper warps toward the opposite side of a printed side) right after printed.

When the plain paper curls back right after printed, papers are not smoothly fed in an inkjet printer. Particularly when a paper curls back in high-speed printing or both side printing, the paper is very difficult to feed.

Therefore, an inkjet ink causing a paper to curl back less even when printing a picture or a drawing needing much ink is demanded.

Particularly, a high-speed inkjet printer including a line head needs such an ink more than a serial printer.

As a conventional method of preventing the curl, Japanese published unexamined application No. JP-2004-136458-A discloses a method of applying an alcohol liquid to a paper, drying the paper at a recording position, and recording with an ink. Japanese published unexamined application No. JP-2008-18711-A discloses a recording method of discharging an ink and a reaction liquid reacting with the ink.

Japanese published unexamined application No. JP-2009-52018-A discloses an inkjet ink composition including diglycerin or polyglycerin and polyethyleneglycolmonoalkylether. Japanese published unexamined application No. JP-2009-287014-A discloses an inkjet ink composition including polyethyleneglycolmonomethylether.

The method disclosed in Japanese published unexamined application No. JP-2004-136458-A does not have an effect of preventing curl right after printed when a water ink is used in a large amount at high speed. The method disclosed in Japanese published unexamined application No. JP-2008-18711-A makes a recorder complicated and uneconomically discharges the reaction liquid in the same amount of the ink to prevent curl. Further, when a solid image is printed, both sides of a paper include much water content and the paper loses stiffness, which is difficult to feed. The methods disclosed in Japanese published unexamined applications Nos. JP-2009-52018-A and JP-2009-287014-A do not have an effect of preventing curl right after printed when a water ink is used in a large amount at high speed. Further, solvents included do not include sufficient average water content, resulting in unstable dischargeability.

Further, the conventional methods have the following problems (a) to (c).

(a) Solid image beading (dots adjacent to each other attracts each other, resulting in a rash on an image) or color bleed among colors occurs.

(b) When conventional multivalent metallic salts are used as a pretreatment liquid, an ink is difficult to fix.

(c) An inkjet ink (aqueous ink) causes cockling (a solid image waves) or curling back right after a solid image is printed.

Because of these reasons, a need exist for an image forming method capable of recording high-quality full-color images not only on plain papers but also on commercial printing papers at high speed and reducing curling right after printed, and further causing almost no beading of a solid image or color bleed among colors.

SUMMARY OF THE INVENTION

Accordingly, one object of the present invention to provide an image forming method capable of recording high-quality full-color images not only on plain papers but also on commercial printing papers at high speed and reducing curling right after printed, and further causing almost no beading of a solid image or color bleed among colors.

These objects and other objects of the present invention, either individually or collectively, have been satisfied by the discovery of an image forming method, comprising:

applying a pretreatment liquid on the surface of a recording medium; and applying an inkjet ink comprising a colorant, a hydrosoluble organic solvent, a surfactant and water on the surface applied with the pretreatment liquid, wherein the hydrosoluble organic solvent comprises:

at least one polyol comprising an equilibrium water content in an amount not less than 30% by weight at 23° C. and 80% RH;

an amide compound having the following formula (I); and at least one of compounds having the following formulae (II) to (IV),

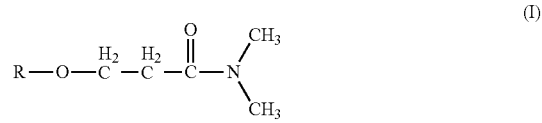

wherein R represents an alkyl group having 4 to 6 carbon atoms,

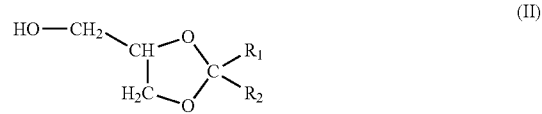

wherein $R_1$ represents a hydrogen atom or an alkyl group having 1 to 2 carbon atoms, and $R_2$ represents an alkyl group having 1 to 4 carbon atoms,

wherein R' represents an alkyl group having 1 to 2 carbon atoms; and $R_3$ represents a hydrogen atom, an alkyl group having 1 to 8 carbon atoms, a cyclic alkyl groups or an aromatic ring,

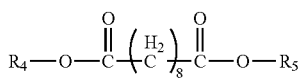
(IV)

wherein $R_4$ and $R_5$ represent an alkyl group having 1 to 8 carbon atoms, respectively, and wherein a pure water transfers to the recording medium in an amount of from 1 to 15 mL/m² when measured by a dynamic scanning liquid absorptometer at a contact time of 100 ms.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIGURE is a schematic view illustrating a trial line heat printer used in evaluation of curl in the present invention.

DETAILED DESCRIPTION OF THE INVENTION

The present invention provides an image forming method capable of recording high-quality full-color images not only on plain papers but also on commercial printing papers at high speed and reducing curling right after printed, and further causing almost no beading of a solid image or color bleed among colors.

More particularly, the present invention relates to an image forming method, comprising:

applying a pretreatment liquid on the surface of a recording medium; and applying an inkjet ink comprising a colorant, a hydrosoluble organic solvent, a surfactant and water on the surface applied with the pretreatment liquid, wherein the hydrosoluble organic solvent comprises:
at least one polyol comprising an equilibrium water content in an amount not less than 30% by weight at 23° C. and 80% RH;
an amide compound having the following formula (I); and
at least one of compounds having the following formulae (II) to (IV),

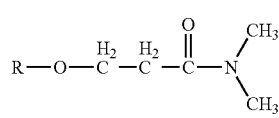
(I)

wherein R represents an alkyl group having 4 to 6 carbon atoms,

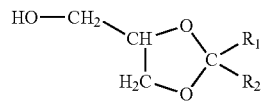
(II)

wherein $R_1$ represents a hydrogen atom or an alkyl group having 1 to 2 carbon atoms, and $R_2$ represents an alkyl group having 1 to 4 carbon atoms,

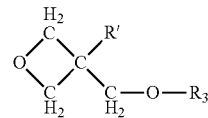
(III)

wherein R' represents an alkyl group having 1 to 2 carbon atoms; and $R_3$ represents a hydrogen atom, an alkyl group having 1 to 8 carbon atoms, a cyclic alkyl groups or an aromatic ring,

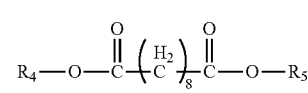
(IV)

wherein $R_4$ and $R_5$ represent an alkyl group having 1 to 8 carbon atoms, respectively, and wherein a pure water transfers to the recording medium in an amount of from 1 to 15 mL/m² when measured by a dynamic scanning liquid absorptometer at a contact time of 100 ms.

The inkjet ink for use in the present invention (hereinafter referred to as an "ink") includes at least a colorant, a hydrosoluble organic solvent, a surfactant and water, and other components such as a penetrant and a hydrodispersible resin when necessary.

The hydrosoluble organic solvent includes at least one polyol comprising an equilibrium water content in an amount not less than 30% by weight at 23° C. and 80% RH; an amide compound having the following formula (I); and at least one of compounds having the following formulae (II) to (IV), and other components such as an amide compound having the following formula (I-2) when necessary:

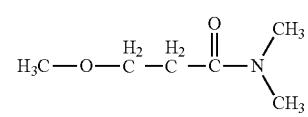
(I-2)

The ink preferably includes the hydrosoluble organic solvent in an amount of from 30 to 70% by weight.

The hydrosoluble organic solvent including an amide compound having the following formula (I) and at least one of compounds having the following formulae (II) to (IV) decreases face curl right after the ink is printed and dries the ink well, causing no beading and color bleed among colors.

Specific examples of the compound having the formulae (I) to (IV) include the following compounds.

<The Amide Compounds Having the Formula (I)>

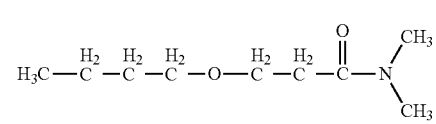
I-3

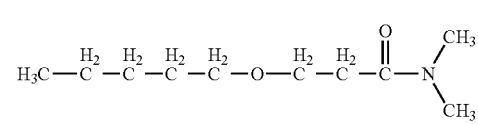
I-4

-continued

I-5
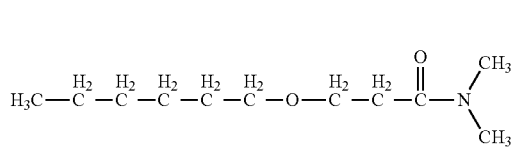

<The Compounds Having the Formula (II)>

II-2
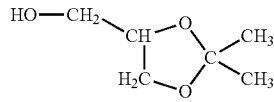

II-3
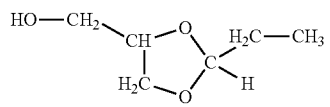

II-4
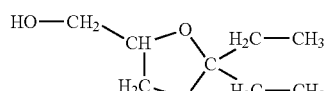

II-5
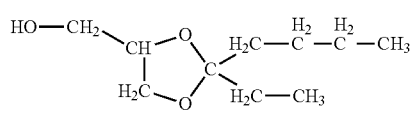

-continued

III-4
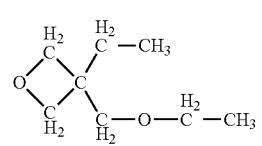

III-5
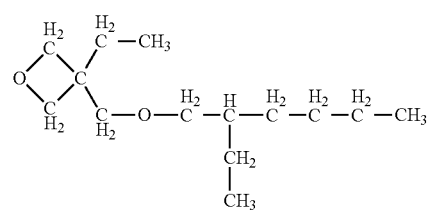

III-6
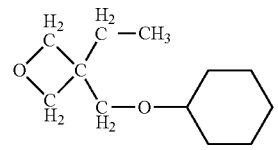

III-7
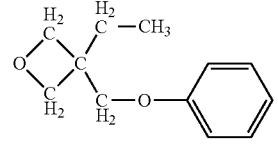

<The Compound Having the Formula (IV)>

IV-2
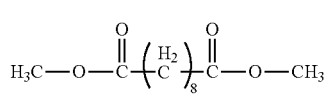

IV-3
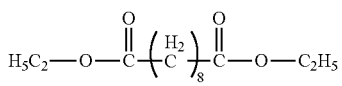

IV-4
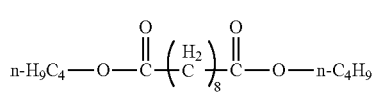

IV-5
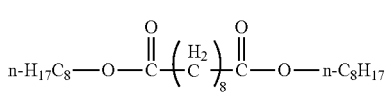

IV-6
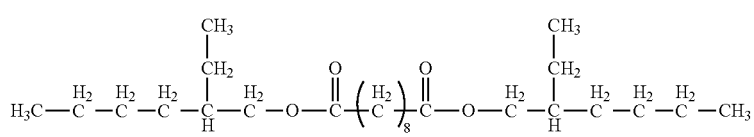

<The Compounds Having the Formula (III)>

III-2
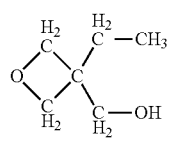

III-3
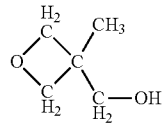

The ink preferably includes the amide compound having the following formula (I) and the compounds having the following formulae (II) to (IV) in an amount of from 1 to 50% by weight, and more preferably from 2 to 40% by weight. When less than 1% by weight, the curl is not prevented, image quality is not improved, drying capability on a general printing paper is not improved, beading or color bleed among colors are not prevented. When greater than 50% by weight, the ink increases in viscosity, resulting in poor discharge stability.

Further, the hydrosoluble organic solvent supplementary preventing curl includes alkylalkanediol. The alkylalkanediol formed of alkanediol having 3 to 6 carbon atoms as a main chain and alkyl having 1 to 2 carbon atoms as a branched chain has good balance of a hydrophilic group and a hydrophobic group, is hydrosoluble and rich is hydrophobic group, and is easy to penetrate a recording medium.

Preferred examples of the alkylalkanediol include 2-methyl-1,3-butanediol (boiling point (bp) 214° C.), 3-methyl-1,3-butanediol (bp 203° C.), 3-methyl-1,5-pentanediol (bp 250° C.) and 2-ethyl-1,3-hexanediol (bp 243.2° C.).

The ink preferably includes the alkylalkanediol in an amount of from 2 to 40% by weight, and more preferably from 5 to 30% by weight. When less than 2% by weight, the ink does not effectively penetrate a recording medium, image quality is not improved, and further drying capability on a general printing paper is not improved. When greater than 40% by weight, the ink increases in viscosity, resulting in poor discharge stability.

A polyol having an equilibrium water content not less than of 30% by weight at a temperature of 23° C. and 80% RH is included as a wetter. The polyol having high equilibrium water content and boiling point is preferably used.

Specific examples thereof include diethylene glycol (boiling point (bp): 245° C., 43% by weight), triethylene glycol (bp: 285° C., 39% by weight), tetraethylene glycol (bp: 324° C. to 330° C., 37% by weight), 1,3-butanediol (bp: 203° C. to 204° C., 35% by weight), glycerin (bp: 290° C., 49% by weight), diglycerin (bp: 270° C./20 hPa, 38% by weight), 1,2,3-butanetriol (bp: 175° C./33 hPa, 38% by weight), and 1,2,4-butanetriol (bp: 190° C. to 191° C./24 hPa, 41% by weight). Among them, 1,3-butanediol and glycerin are preferably used.

The ink preferably includes the polyol in an amount of from 2 to 50% by weight, and more preferably from 5 to 40% by weight. When less than 2% by weight, the ink does not have moisturizing effect. When greater than 50% by weight, the ink has poor capability of drying and image quality on plain papers deteriorates.

The equilibrium water content (%) is determined using a saturated aqueous potassium/sodium chloride solution and a desiccator. The internal temperature of the desiccator is maintained at 23±1° C. and the internal humidity thereof is maintained at 80±3% RH. Then, each sample of aqueous organic solvents is weighed 1 g and poured in a petri dish, and the petri dish is placed in the desiccator and stored, and the equilibrium water content of the sample is determined by the following formula.

$$\text{Equilibrium Water Content (\%)} = \frac{\text{Amount of water absorbed into organic solvent}}{\text{Amount of organic solvent} + \text{Amount of water absorbed into organic solvent}} \times 100$$

The amide compound having the formula (I-2) has a high boiling point of 216° C., a high equilibrium water content of 39.2% by weight at 23° C. and 80% RH, and a very low liquid viscosity of 1.48 mPa·s at 25° C.

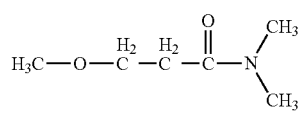

(I-2)

Further, the amide compound having the formula (I-2) is very easy to dissolve in the compounds having the formulae (II) to (IV), alkylalkanediol and water. Therefore, when these compounds are mixed as a hydrosoluble organic solvent in an ink, the ink has low viscosity, good storage and discharge stability, and good suitability to a retainer for ink discharger.

The ink preferably includes the amide compound having the formula (I-2) in an amount of from 1 to 50% by weight, and more preferably from 2 to 40% by weight. When less than 1% by weight, the ink does not have low viscosity. When greater than 50% by weight, the ink has poor capability of drying and image quality on plain papers deteriorates.

The ink may use other hydrosoluble organic solvents and wetters together with the above-mentioned hydrosoluble organic solvents.

Specific examples thereof include polyols, polyol alkyl ethers, polyol aryl ethers, nitrogen-containing heterocyclic compounds, amides, amines, sulfur-containing compounds, propylene carbonate, ethylene carbonate, and other wetters.

Specific examples of the polyols include dipropylene glycol (bp: 232° C.), 1,5-pentanediol (bp: 242° C.), propylene glycol (bp: 187° C.), 2-methyl-2,4-pentanediol (bp: 197° C.), ethylene glycol (bp: 196° C. to 198° C.), tripropylene glycol (bp: 267° C.), hexylene glycol (bp: 197° C.), polyethylene glycol (viscous liquid to solid), polypropylene glycol (bp: 187° C.), 3-methyl-1,3-butanediol (bp: 203° C.), 1,6-hexanediol (bp: 253° C. to 260° C.), 1,2,6-hexanetriol (bp: 178° C.), trimethylolethane (solid, melting point (mp): 199 to 201° C.), and trimethylolpropane (solid, mp: 61° C.), etc.

Specific examples of the polyol alkyl ethers include ethylene glycol monoethylether (bp: 135° C.), ethylene glycol monobutylether (bp: 171° C.), diethylene glycol monomethylether (bp: 194° C.), diethylene glycol monoethylether (bp: 197° C.), diethylene glycol monobutylether (bp: 231° C.), ethylene glycol mono-2-ethylhexylether (bp: 229° C.), and propylene glycol monoethylether (bp: 132° C.).

Specific examples of the polyol aryl ethers include ethylene glycol monophenyl ether (bp: 237° C.), and ethylene glycol monobenzyl ether.

Specific examples of the nitrogen-containing heterocyclic compounds include 2-pyrrolidone (bp: 250° C., mp: 25.5° C., 47% by weight to 48% by weight), N-methyl-2-pyrrolidone (bp: 202° C.), 1,3-dimethyl-2-imidazolidionone (bp: 226° C.), ε-caprolactam (bp: 270° C.), and γ-butyrolactone (bp: 204° C. to 205° C.).

Specific examples of the amides include formamide (bp: 210° C.), N-methylformamide (bp: 199° C. to 201° C.), N,N-dimethylformamide (bp: 153° C.), and N,N-diethylformamide (bp: 176° C. to 177° C.).

Specific examples of the amines include monoethanolamine (bp: 170° C.), dimethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C. to 287° C.), and 3-aminopropyl diethylamine (bp: 169° C.).

Specific examples of the sulfur-containing compounds include dimethylsulfoxide (bp: 139° C.), sulfolane (bp: 285° C.), and thiodiglycol (bp: 282° C.).

As other solid wetters, saccharides are preferably used. Specific examples of the saccharides include monosaccharides, disaccharides, oligosaccharides (including trisaccharides and tetrasaccharides), and polysaccharides.

Specific examples thereof include glucose, mannose, fructose, ribose, xylose, arabinose, galactose, maltose, cellobiose, lactose, sucrose, trehalose, and maltotriose.

Here, the above-mentioned polysaccharides mean broad sense-saccharides, which may include materials existing widely in nature, such as α-cyclodextrin and cellulose.

Derivatives of these saccharides include reducing sugars of saccharides (for example, sugar alcohol, which has the formula $HOCH_2(CHOH)_nCH_2OH$, where n is an integer of 2 to 5), oxidized sugars (for example, aldonic acids and uronic acids), amino acids, and thio acids.

Among them, sugar alcohol is preferably used. Specific examples of the sugar alcohol include maltitol and sorbitol.

The content ratio of the colorant to the hydrosoluble organic solvent influences on the ink discharge stability from a head much, and further on waste ink anchorage prevention in a retainer for ink discharger.

When the content of the colorant is high and that of the hydrosoluble organic solvent is low, water around the ink meniscus of a nozzle evaporates too much for the ink to discharge.

When the colorant is a pigment, the following three embodiments are preferable.

(1) The colorant has at least a hydrophilic group on its surface and includes a pigment having water-dispersibility (hereinafter referred to as a "self-dispersible pigment").

(2) The colorant is a pigment dispersion including a pigment, a pigment dispersant and a polymeric dispersion stabilizer. The polymeric dispersion stabilizer is a member selected from the group consisting of α-olefin-maleic anhydride copolymers having the following formula and a weight-average molecular weight of from 5,000 to 20,000, styrene-(meth)acrylic acid copolymers, hydrosoluble polyurethane resins and hydrosoluble polyester resins:

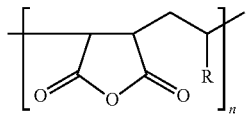

wherein R represents an alkyl group having 6 to 30 carbon atoms, preferably 12 to 24 carbon atoms, more preferably 18 to 22 carbon atoms, n represents an integer of from 20 to 100.

In the present invention, α-olefin-maleic anhydride copolymer in which alkyl groups having different number of carbon atoms are randomly introduced into polymer chain may be used as the α-olefin-maleic anhydride copolymer having the above-mentioned formula.

(3) The colorant includes a polymer emulsion including a particulate polymer and a water-insoluble or a water-hardly-insoluble color material (water dispersion of a particulate polymer including a color material).

Inorganic pigments and organic pigments can be used as the pigment. For the purpose of controlling color tone, a dye may be included in the inkjet ink in the range not impairing the weatherability.

Specific examples of the inorganic pigments include titanium oxide, iron oxide, calcium carbonate, barium sulfate, aluminum hydroxide, barium yellow, cadmium red, chrome yellow and carbon black, etc. Among them, the carbon black is preferably used. The carbon black is produced by known methods such as a contact method, a furnace method, and a thermal method.

Specific examples of the organic pigment include azo pigments, polycyclic pigments, dye chelate, a nitro pigment, a nitroso pigment, aniline black, etc. Among them, the azo pigments and the polycyclic pigments are preferably used. Specific examples of the azo pigments include azo lake, an insoluble azo pigment, a condensed azo pigment, a chelate azo pigment, etc. Specific examples of the polycyclic pigments include a phthalocyanine pigment, a perylene pigment, a perinone pigment, an anthraquinone pigment, a quinacridon pigment, a dioxazine pigment, an indigo pigment, a thioindigo pigment, an iso-indolinone pigment, a quinophtharone pigment, etc. Specific examples of the dye chelate include basic dye chelate, acid dye chelate, etc.

Colors of the colorants are not particularly limited, and can be selected according to the purposes. The colorant can be used alone or in combination.

Specific examples of the pigment for black include carbon black (C.I. Pigment Black 7) such as furnace black, lamp black, acetylene black, and channel black; metals such as copper, iron (C.I. Pigment Black 11); metal oxides such as titanium oxide; and organic pigments such as aniline black (C.I. Pigment Black 1).

Specific examples of the preferable pigment for color include C.I. Pigment Yellow 1, 3, 12, 13, 14, 17, 24, 34, 35, 37, 42 (yellow oxide), 53, 55, 74, 81, 83, 95, 97, 98, 100, 101, 104, 408, 109, 110, 117, 120, 128, 138, 150, 151, 153, 183; C.I. Pigment Orange 5, 13, 16, 17, 36, 43, 51; C.I. Pigment Red 1, 2, 3, 5, 17, 22, 23, 31, 38, 48:2 (Parmanent Red 2B(Ca)), 48:3, 48:4, 49:1, 52:2, 53:1, 57:1 (brilliant carmine 6B), 60:1, 63:1, 63:2, 64:1, 81, 83, 88, 101 (iron red), 104, 105, 106, 108 (cadmium red), 112, 114, 122 (quinacridon magenta), 123, 146, 149, 166, 168, 170, 172, 177, 178, 179, 185, 190, 193, 209, 219; C.I. Pigment Violet 1 (rhodamine lake), 3, 5:1, 16, 19, 23, 38; C.I. Pigment Blue 1, 2, 15, 15:1, 15:2, 15:3 (phthalocyanine blue), 16, 17:1, 56, 60, 63; and C.I. Pigment Green 1, 4, 7, 8, 10, 17, 18, 36.

The self-dispersible pigment is a pigment each surface of particles of which is modified by bonding at least one hydrophilic group directly or via other atomic group to the surface thereof. As a method for this surface modification, a method in which a predetermined functional group (a functional group such as a sulfo group, a carboxyl group, and the like) is chemically bonded to the surface of each particle of the pigment, or a wet oxidation process using hypohalous acid or a salt thereof is used. Among these methods, a method in which a carboxyl group is bonded to a surface of each particle of a pigment, and the pigment is then dispersed in water is particularly preferable. By bonding the carboxyl group to a modified surface of each particle of the pigment, dispersion stability of the pigment improves, high quality images can be provided by the resulting ink, and water resistance of a recording medium after recording improves.

An ink including the self-dispersible pigment has good re-dispersibility after dried. Even after printing is paused for long periods and the water content of the ink around the inkjet head nozzle evaporates, the nozzle is not clogged and simple cleaning resumes good printing.

The self-dispersible pigment preferably has a volume-average particle diameter (D50) of from 0.01 to 0.16 vim in tan ink.

As a self-dispersible carbon black, an ionic carbon black is preferably used, and is preferably anionically or cationically charged.

Specific examples of the anionic hydrophilic group include —COOM, —$SO_3M$, —$PO_3HM$, —$PO_3M_2$, —$SO_2NH_2$, and —$SO_2NHCOR$, where M is alkali metal, ammonium or organic ammonium; and R is a C1-C12 alkyl group, a substituted or unsubstituted phenyl group, or a substituted or unsubstituted naphthyl group. Among them, —COOM, and —$SO_3M$ are preferable. In the case where "M" in the aforementioned functional group is alkali metal, examples of such alkali metal include lithium, sodium, and potassium. In the case where "M" in the aforementioned functional group is organic ammonium, examples of such organic ammonium include mono-, di-, or trimethyl ammonium, mono-, di-, or triethyl ammonium, and mono-, di-, or trimethanol ammonium.

For attaining a color pigment having an anionic functional group, the anionic functional group (e.g. —COONa) can be introduced to a surface of each particle of the color pigment, for example, by a method in which a color pigment is subjected to oxidation treatment with sodium hypochlorite, a method by sulfonation, or a method to react with diazonium salt.

As the cationic hydrophilic group, a quaternary ammonium group is preferably used, and quaternary ammonium groups having the following formulae are more preferably used. In the present invention, a pigment including carbon black, the surface of which is combined with any one of them is preferably used.

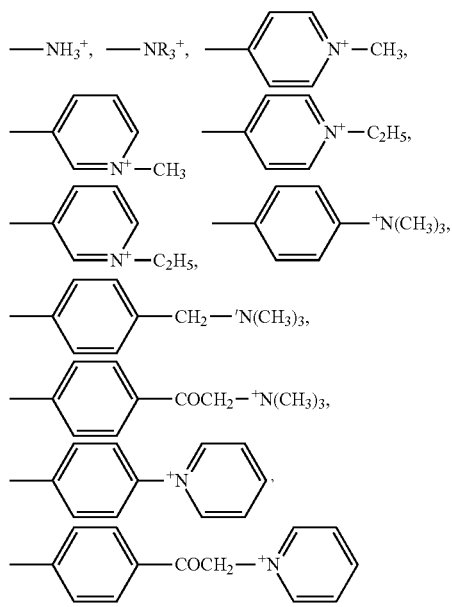

Methods of a cationic self-dispersible carbon black combined with the hydrophilic group are not particularly limited, and can be selected according to the purposes. Specific examples thereof include a method of reacting carbon black with 3-amino-N-ethylpyridiumbromide to combine an N-ethylpyridium group having the following formula:

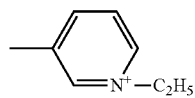

The hydrophilic group may be bonded to the surface of the carbon black via other atomic groups. Examples of such atomic group include a C1-C12 alkyl group, a substituted or unsubstituted phenyl group, and a substituted or unsubstituted naphthyl group. Specific examples of the substituent group bonded to the surface of the carbon black via the atomic group include —$C_2H_4COOM$ (M is alkali metal or quaternary ammonium), —$PhSO_3M$ (Ph is a phenyl group, and M is alkali metal or quaternary ammonium), —$C_5H_{10}NH_3^+$, etc.

The colorant includes a pigment such as an inorganic pigment, an organic pigment and a complex pigment; a pigment dispersant; and a polymeric dispersion stabilizer.

The polymeric dispersion stabilizer effectively maintains the dispersion status of the pigment dispersion uniformly and finely dispersed in water by the pigment dispersant. The α-olefin-maleic anhydride copolymer having the above-mentioned formula, styrene-(meth)acrylic copolymer, the hydrosoluble polyurethane resin and the hydrosoluble polyester resin are solid at room temperature and barely soluble in iced water. However, when the copolymer and the resin are dissolved in an alkali (aqueous) solution equivalent (preferably 1.0 to 1.5 times) to the acid value of the copolymer and the resin, the solution demonstrates the effect of a dispersion stabilizer.

The copolymer and the resin are easily dissolved in an alkali (aqueous) solution by heating while stirring. However, when the olefin chain is long in the copolymer of α-olefin-maleic anhydride, it is not easy to dissolve the copolymer in the alkali (aqueous) solution and insoluble matters may remain in some cases. In such a case, the solution can be still suitably used as the polymer dispersion stabilizer when the insoluble matter is removed with a filter, etc.

Specific examples of the base in the alkali (aqueous) solutions include, but are not limited to, hydroxides of alkali metals such as sodium hydroxide, potassium hydroxide, lithium hydroxide; basic materials such as ammonia, triethyl amine, and morpholine; and alcohol amine such as triethanol amine, diethanol amine, N-methyl diethanol. 2-amino-2-ethyl-1,3-propane diol, and choline.

The α-olefin-maleic anhydride copolymer having the above-mentioned formula can be synthesized or is available from the market. Specific examples of the market products thereof include, but are not limited to, T-YP112, T-YP115, T-YP114, and T-YP116 (all from Seiko PMC Corp.).

The styrene-(meth)acrylic copolymer can be synthesized or is available from the market. Specific examples of the market products thereof include, but are not limited to, JC-05 (from Seiko PMC Corp.), ARUFRON UC-3900, ARUFRON UC-3910, and ARUFRON UC-3920 (from Toagosei Co., Ltd.).

Any marketed product of the hydrosoluble polyurethane resin and any synthesized hydrosoluble polyester resin can be suitably used. Specific examples of the marketed products include, but are not limited to, Takelac W-5025, Takelac W-6010, and Takelac W-5661 (from Mitsui Chemicals, Inc.).

Any marketed products of hydrosoluble polyester resins and any synthesized hydrosoluble polyurethane resins can be suitably used as the hydrosoluble polyurethane resin described above. Specific examples of the marketed products thereof include, but are not limited to, Nichigo Polyester W-0030, Nichigo Polyester W-0005S30WO, and Nichigo Polyester WR-961 (from the Nippon Synthesis Chemical Industry Co., Ltd.), PESRESIN A-210, and PESRESIN A-520 (from Takamatsu Oil & Fat Co., Ltd.).

The acid value of the polymer dispersion stabilizer is preferably from 40 to 400 mgKOH/g and more preferably from 60 to 350 mgKOH/g. When the acid value is too small, the solubility of the alkali solution tends to be inferior. When the acid value is too large, the viscosity of the pigment tends to increase, thereby degrading discharging ink performance or reducing the dispersion stability of the pigment dispersion.

The weight average molecular weight of the polymer dispersion stabilize is preferably 20,000 or lower and more preferably from 5,000 to 20,000. When the weight average molecular weight is too small, the dispersion stability of the pigment dispersion tends to deteriorate. When the weight average molecular weight is too large, the solubility of the alkali solution tends to be inferior or the viscosity tends to increase.

The content of the polymer dispersion stabilizer is preferably from 1 part by weight to 100 parts by weight (conversion in solid portion) and more preferably from 5 parts by weight to 50 parts by weight based on 100 parts by weight of the pigment. When the content of the polymer dispersion stabilizer is too small, the effect of the polymer dispersion stabilizer tends to lose. When the content of the polymer dispersion stabilizer is too large, the ink viscosity tends to increase, thereby degrading discharging ink performance or increasing the cost.

It is preferable that the colorant contains a pigment dispersant. As the polymer dispersant, anionic surfactants and nonionic surfactants having an HLB value of from 10 to 20 are preferably used.

Specific examples of the anionic surfactant include, but are not limited to, polyoxyethylene alkyl ether acetates, alkyl benzene sulfonates (e.g., $NH_4$, Na, and Ca), alkyl diphenyl ether disulfonates (e.g., $NH_4$, Na, and Ca), sodium salts of dialkyl succinate sulfonates, formalin condensed sodium salts of naphthalene sulfonates, polyoxyethylene polycyclic phenyl ether sufuric acid esters (e.g., $NH_4$ and Na), laurates, polyoxyethylene alkyl ether sulfates, and oleates. Among these, sodium salts of dioctyl sulfosuccinate and $NH_4$ salts of polyoxyethylene styrene phenyl ether sulfonates are more preferably used.

Specific examples of the nonionic surfactants having an HLB value of from 10 to 20 include, but are not limited to, polyoxyethylene alkyl ether, polyoxyalkylene alkyl ether, polyoxyethylene polycyclic phenyl ether, sorbitan aliphatic acid esters, polyoxy ethylene sorbitan aliphatic esters, polyoxyethylene sorbitan aliphatic esters, polyoxyethylene alkyl phenyl ethers, polyoxyethylene alkyl amines, polyoxyethylene alkyl amides, and acetylene glycol.

Among these, polyoxyethylene lauryl ether, polyoxyethylene-β-naphtyl ether, polyoxyethylene sorbitan monooleate, and polyoxyethylene styrene phenyl ether are particularly preferable.

The content of the polymer dispersant is preferably from 1 to 100 parts by weight and more preferably from 10 to 50 parts by weight based on 100 parts by weight of the pigment. When the content of the pigment dispersant is too small, the pigment tends not to be sufficiently refined. When the content of the pigment dispersant is too large, excessive components which are not adsorbed to the pigments tend to have an impact on the ink properties, resulting in deterioration on image blurring, water resistance, and abrasion resistance.

The volume-average particle diameter (D50) of the pigment dispersion in the ink is preferably 150 nm or less and more preferably 100 nm or less. When the volume-average particle diameter (D50) is too large, the discharging stability tends to drastically deteriorate, thereby causing clogging in the nozzle or displacing ink on a recording medium. In addition, when the average particle diameter is too small, the discharging stability tends to ameliorate, thereby improving the saturation of produced images.

The pigment dispersion uniformly and minutely dispersed in water by the polymer dispersant can be prepared by dissolving the polymer dispersant in an aqueous medium, adding the pigment to the solution followed by sufficient moistening, and mixing and kneading and dispersing the mixture by high speed stirring by a homogenizer, a disperser using balls such as a bead mill and a ball mill, a mixing and kneading disperser using a shearing force such as a roll mill, or an ultrasonic disperser. However, coarse particles tend to remain after the mixing and kneading and dispersing process, which causes clogging in the inkjet nozzle or the supplying route. Therefore, such coarse particles (e.g., a particle diameter of 1 µm or greater) are required to be removed by a filter or a centrifugal.

As the hydrodispersible colorant, in addition to the pigment specified above, it is preferable to use a polymer emulsion in which polymer particulates contain the pigment. The polymer emulsion in which polymer particulates contain the pigment means an emulsion in which the pigments are encapsulated in the polymer particulates or adsorbed on the surface of the polymer particulates. In this case, it is not necessary that all the pigments are encapsulated or adsorbed and some of the pigments may be dispersed in the emulsion unless they do not have an adverse impact on the effect of the present invention. Specific examples of the polymers (polymer in the polymer particulates) forming the polymer emulsions include, but are not limited to, vinyl-based polymers, polyester-based polymers, and polyurethane-based polymers. In particular, the polymers specified in Japanese published unexamined applications Nos. 2000-53897-A and 2001-139849-A can be suitably used.

Conventional organic pigments, or a complex pigment formed of an inorganic pigment coated with an organic pigment or carbon black are preferably used. The complex pigment can be prepared by a method of precipitating an organic pigment under the presence of an inorganic pigment or a mechanochemical method of mechanically mixing and pulverizing upon application of friction, etc. Further, when necessary, an organosiloxane compound layer produced from polysiloxane and alkyl silane is formed between the inorganic pigment and the organic pigment to improve adhesiveness therebetween.

As the organic pigments, black pigments include carbon black, aniline black, etc.; and color pigments include anthraquinone, phthalocyanine blue, phthalocyanine green, diazo, monoazo, pyranthrone, perylene, heterocyclic yellow, quinacridone, (thio)indigoid, etc. Among these, carbon black, phthalocyanine pigments, quinacridone pigments, monoazo yellow pigments, disazo yellow pigments and heterocyclic yellow pigments are preferably used in terms of colorability.

Specific examples of the phthalocyanine blue include copper phthalocyanine blue or its derivative (C.I. Pigment Blue 15:3, 15:4), aluminum phthalocyanine, etc.

Specific examples of the quinacridone include C.I. Pigment Orange 48, C.I. Pigment Orange 49, C.I. Pigment Red 122, C.I. Pigment Red 192, C.I. Pigment Red 202, C.I. Pigment Red 206, C.I. Pigment Red 207, C.I. Pigment Red 209, C.I. Pigment Violet 19, C.I. Pigment Violet 42, etc.

Specific examples of the monoazo yellow pigments include C.I. Pigment Yellow 74, C.I. Pigment Yellow 109, C.I. Pigment Yellow 128, C.I. Pigment Yellow 151, etc.

Specific examples of the disazo yellow pigments include C.I. Pigment Yellow 14, C.I. Pigment Yellow 16, C.I. Pigment Yellow 17, etc.

Specific examples of the heterocyclic yellow pigments include C.I. Pigment Yellow 117, C.I. Pigment Yellow 138, etc.

Other suitable coloring pigments are disclosed in The Color Index, the third edition (The Society of Dyers and Colourists, 1982).

Specific examples of the inorganic pigments include titanium dioxide, silica, iron oxide, iron hydroxide, tin oxide, etc. The smaller the aspect ratio, the better the shape of the particle, and sphericity is most preferable. The inorganic pigment is preferably transparent or white when color materials are adsorbed on the surface thereof. When a black color material is adsorbed thereon, a black inorganic pigment may be used. The inorganic pigment preferably has a primary particle diameter not greater than 100 nm, and more preferably from 5 to 50 nm.

The weight ratio of the inorganic pigment to the coloring material, i.e., the organic pigment or the carbon black is preferably from 3/1 to 1/3, and more preferably from 3/2 to 1/2. When the amount of the coloring material is too low, the colorability deteriorates. When too much, the transparency or the color tone deteriorates.

As the particulate coloring materials formed of an inorganic pigment coated with an organic pigment or carbon black, silica/carbon black complex materials, silica/phthalocyanine PB 15:3 complex materials, silica/disazo yellow complex materials, silica/quinacridone PR122 complex materials from Toda Kogyo Corp., etc. having small primary particle diameters are preferably used.

When an inorganic pigment having a primary particle diameter of 20 nm is coated with an organic pigment in an amount equivalent to that of the inorganic pigment, the resultant pigment has a primary particle diameter about 25 nm. When this is dispersed with a dispersant, a fine pigment-dispersed ink including particles having a diameter of 25 nm can be prepared. Not only the organic pigment on the surface of the complex pigment affects the dispersion, but also the inorganic pigment does through a thin layer of the organic pigment having a thickness about 2.5 nm, and it is essential to select a pigment dispersant to stabilize dispersion of both of the pigments.

The ink preferably includes the colorant in a solid content amount of from 2 to 15% by weight, and more preferably from 3 to 12% by weight. When less than 2% by weight, the ink colorability and image density deteriorate. When greater than 15% by weight, the ink increases in viscosity, resulting in deterioration of dischargeability and cost increase.

The surfactant preferably does not impair dispersion stability due to combination of the colorant and the wetter, has low static surface tension, and has high penetrating and leveling capability. A surfactant selected from the group consisting of anionic surfactants, nonionic surfactants, silicone surfactants and fluorine surfactants. Among these, the silicone surfactants and the fluorine surfactants are particularly preferable. These surfactants can be used alone or in combination.

The fluorine surfactants in which the number of carbon atoms replaced with fluorine atoms is from 2 to 16 is preferable and, 4 to 16, more preferable. When the number of replaced carbon atoms with fluorine atoms is too small, the effect of fluorine atoms may not be demonstrated. When the number of replaced carbon atoms with fluorine atoms is too large, a problem may occur with regard to the ink preservability, etc.

Specific examples of the anionic fluorine surfactants include, but are not limited to, perfluoroalkyl sulfonic acid compounds, perfluoroalkyl carboxylic acid compounds, etc. Specific examples of the perfluoroalkyl sulfonic acid compounds include, but are not limited to, perfluoroalkyl sulfonic acid and salts of perfluoroalkylsulfonic acid. Specific examples of the perfluoroalkyl carboxylic acid compounds include, but are not limited to, perfluoroalkyl carboxylic acid and salts of perfluoroalkyl carboxylic acid, etc.

Specific examples of the nonionic fluorine surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain, etc.

Among these, polyoxyalkylene ether polymer compounds having a perfluoroalkyl ether group in its side chain are particularly preferable because of its low foaming property. Specific examples thereof include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain, etc. The fluorine surfactant having the following formula are more preferable.

wherein m and n represent integers not less than 0, and m is preferably from 0 to 10 and n is preferably from 0 to 40 to impart hydrosolubility.

Specific examples of the perfluoroalkyl phosphoric acid ester compounds include, but are not limited to, perfluoroalkyl phosphoric acid esters and salts of perfluoroalkyl phosphoric acid esters.

Counter ions of salts in these fluorine surfactants are, for example, Li, Ha, K, $NH_4$, $NH_3CH_2CH_2CH$, $NH_2(CH_2CH_2OH)_2$, and $NH(CH_2CH_2OH)_3$.

As the fluorine surfactants, compound having the following formulae are preferably used.

1. Anionic Fluorine Surfactant

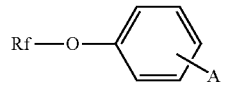

wherein Rf represents a mixture of a fluorine-containing hydrophobic group having the following formula and A represents $—SO_3X$, $—COOX$, or $—PO_3X$, where X represents a counter cation. Specific examples of X include, but are not limited to, Li, Na, K, $NH_4$, $NH_3CH_2CH_2OH$, $NH_2(CH_2CH_2OH)_2$, and $NH(CH_2CH_2OH)_3$.

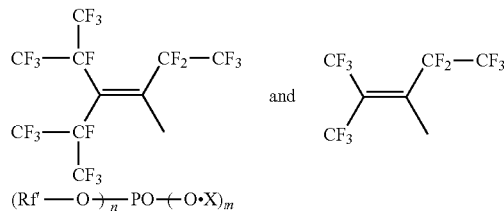

wherein Rf' represents a fluorine-containing group having the following formula, X represents the same as above and n is 1 or 2 and m is 2–n.

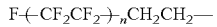

wherein n represents an integer of from 3 to 10.

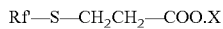

wherein Rf' and X are the same as above.

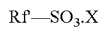

wherein Rf' and X are the same as above.

2. Nonionic Fluorine Surfactant

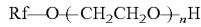

wherein Rf is the same as above and n represents an integer of from 5 to 20.

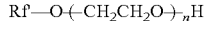

wherein Rf is the same as above and n represents an integer of from 1 to 40.

3. Amphoteric Fluorine Surfactant

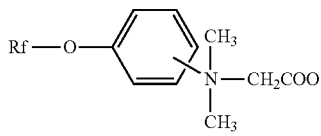

wherein Rf is the same as above.

4. Oligomer Fluorine Surfactant

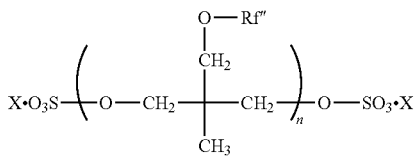

wherein Rf' represents a fluorine-containing group having the following formula, n represents 0 or an integer of from 1 to 10 and X represents the same above.

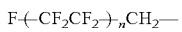

wherein n represents an integer of from 1 to 4.

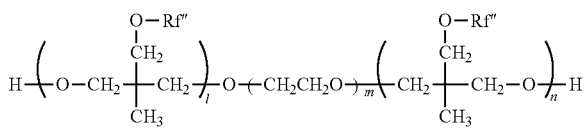

wherein Rf" is the same as above, l, m, and n independently represent zero or an integer of from 1 to 10.

Specific examples of the products of the fluorine surfactants available from the market include, but are not limited to, Surflon S-111, Surflon S-112, Surflon S-121, Surflon S-131, Surflon S-132, Surflon S-141, and Surflon S-145 (all from ASAHI GLASS CO., LTD.); Fluorad FC-93, FC-95, FC-98, FC-129, FC-135, FC-170C, FC-430, and FC-431 (all from Sumitomo 3M); MegaFac F-470, F-1405, and F-474 (all from DIC Corporation); Zonyl TBS, FSP, FSA, FSN-100, FSN, FSO-100, FSO, FS-300 UR (all from Du Pont Kabushiki Kaisha); FT-110, FT-250, FT-251, FT-400S, FT-150 and FT-400SW (all from Neos Company Limited); and Polyfox PF-151N (from Omnova Solutions Inc.). Among these, in terms of improvement on the printing quality, in particular the color property and the uniform dying property on paper, FS-300 of Du Pont Kabushiki Kaisha, FT-110, FT-250, FT-251, FT-400S, FT-150, and FT-400SW of Neos Company Limited, and Polyfox PF-151N of Omnova Solutions Inc. are particularly preferred.

Specific examples of the silicone surfactants include, but are not limited to, side-chain-modified polydimethylsiloxane, both end-modified polydimethylsiloxane, one end modified polydimethylsiloxane, and side-chain both end modified polydimethylsiloxane. A polyether-modified silicone surfactant which has a polyoxyethylene group and/or a polyoxyethylene polyoxypropylene group is particularly preferable because of its good characteristics as an aqueous surfactant.

Any suitably synthesized surfactant and products thereof available in the market can be also used. Products available in the market are easily obtained by Byc Chemie Japan Co., Ltd., Shin-Etsu Silicone Co., Ltd., Dow Corning Toray Co., Ltd., etc.

There is no specific limit to the polyether-modified silicone surfactant. For example, a compound in which the polyalkylene oxide structure having the following formula is introduced into the side chain of the Si portion of dimethyl polysiloxane.

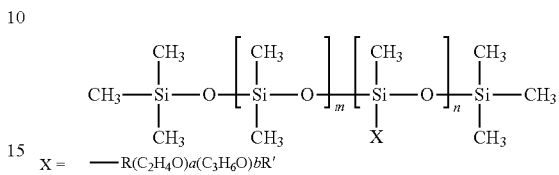

wherein m, n, a, and b independently represent integers, and R and R' independently represent an alkyl groups and an alkylene group Specific examples of the polyether-modified silicone surfactants include, but are not limited to, KF-618, KF-642, and KF-643 from Shin-Etsu Chemical Co., Ltd.; EMALE X—SS-5602 and SS-1906EX from Nihon-Emulsion Co, Ltd.; FZ-2105, FZ-2118, FZ-2154, FZ-2161, FZ-2162, FX-2163 and FZ-2164 from Dow Corning Toray Silicone Co., Ltd.; and BYK-33 and BYK-387 (BYK-Chemie GmbH), etc.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyoxyethylene alkyl ether, polyoxypropylene polyoxyethylene alkyl ether, polyoxyethylene alkyl esters, polyoxy ethylene sorbitan aliphatic esters, polyoxyethylene alkyl phenyl ethers, polyoxyethylene alkyl amines, and polyoxyethylenealky amides.

The ink preferably includes the surfactants in an amount of from 0.001 to 5% by weight, and more preferably from 0.05 to 1% by weight. When less than 0.001% by weight, the effect of the surfactant is small. Even when greater than 5% by weight, the effect does not change.

The ink preferably includes at least one of a non-wettable polyol compound or a glycol ether compound having 8 to 11 carbon atoms as a penetrant. Non-wettability means a solubility of from 0.2% to 5.0% by weight in water at 25° C.

As the penetrant, a 1,3-diol compound having the following formula is preferable, and 2-ethyl-1,3-hexane diol (having solubility of 4.2% at 25° C.) and 2,2,4-trimethyl-1,3-pentane diol (having solubility of 2.0% at 25° C.) are particularly preferable.

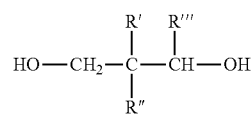

wherein R' represents a methyl group or an ethyl group; R" represents a hydrogen atom or a methyl group; and R'" represents an ethyl group or a propyl group.

Specific examples of the other non-wettable polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3- propane diol, 2,4-dimethyl-2,4-pentane diol, 2,5-dimethyl-2, 5-hexane diol, and 5-hexene-1,2-diol.

Any other penetrants which can be dissolved in ink and adjusted to have desired characteristics can be used in combination. Specific examples thereof include, but are not limited to, alkyl and aryl ethers of polyols such as diethylene glycol monophenylether, ethylene glycol monophenylether, ethylene glycol monoaryl ether, diethylene glycol monophenyl ether, diethylene glycol monobutyl ether, propylene glycol monobutyl ether, and tetraethylene glycol chlorophenyl ether and lower alcohols such as ethanol.

The ink preferably includes the penetrant in an amount of from 0.1 to 4.0% by weight. When less than 0.1% by weight, the obtained image may not dry soon, resulting in a blurred image. When greater than 4.0% by weight, the dispersion stability of the coloring agent may deteriorate, nozzles tends to clog, and the permeability tends to be excessively high, which leads to a decrease in the image density and occurrence of strike-through.

Hydrodispersible resins have excellent film-forming (image forming) property, water repellency, water-resistance, and weathering properties. Therefore, these are suitable for image recording requiring high water-resistance and high image density.

Specific examples thereof include, but are not limited to, condensation-based resins, addition-based resins, and natural polymers.

Specific examples of the condensation-based resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based resins include, but are not limited to, polyolefin resins, polystyrene resins, polyvinyl alcohol resins, polyvinyl ester resins, polyacrylic acid resins, and unsaturated carboxylic acid resins.

Specific examples of the natural resins include, but are not limited to, celluloses, rosins, and natural rubber.

Among these, polyurethane resin particulates, acrylic-silicone resin particulates, and fluorine-containing resin particulates are preferable. These can be used alone or in combination.

As the fluorine-containing resins, fluorine-containing resin particulates having fluoro-olefin units are preferable. Among these, fluorine-containing vinyl ether resin particulates formed of fluoro-olefin units and vinyl ether units are particularly preferable.

There is no specific limit to the selection of the fluoro-olefin units. Specific examples thereof include, but are not limited to, —CF$_2$CF$_2$—, —CF$_2$CF(CF$_3$)—, and —CF$_2$CFCl—.

There is no specific limit to the selection of fluoro-olefin units. For example, the compounds having the following formulae.

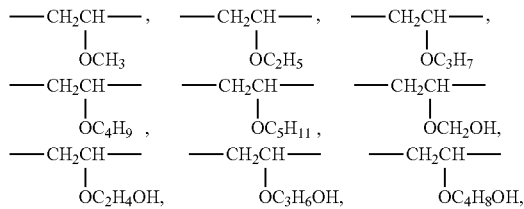

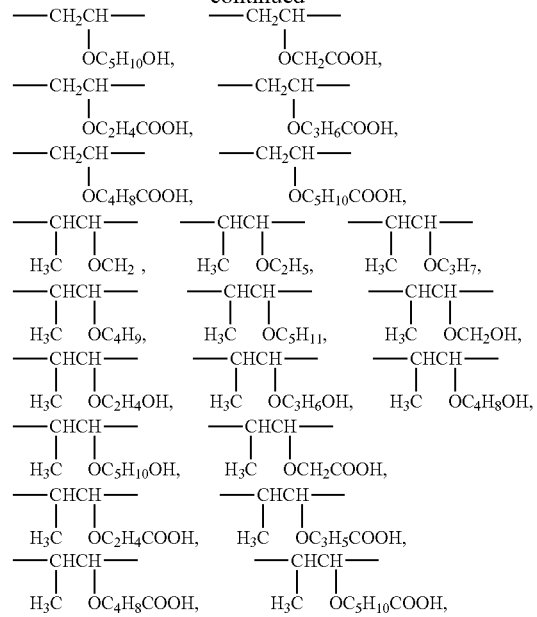

As the fluorine-containing vinyl ether resin particulates formed of fluoro-olefin units and vinyl ether units, alternate copolymers in which fluoro-olefin units and vinyl ether units are alternately co-polymerized are preferable.

Any suitably synthesized fluorine-containing resin particulates and products thereof available in the market can be also used. Specific examples of the products available in the market include, but are not limited to, FLUONATE FEM-500, FEM-600, DICGUARD F-52S, F-90, F-90M, F-90N, and AQUA FURAN TE-5A (all from DIC Corporation); and LUMIFLON FE4300, FE4500, and FE4400, ASAHI GUARD AG-7105, AG-950, AG-7600, AG-7000, and AG-1100 (all from ASAHI GLASS CO., LTD.).

The hydrodispersible resins can be used as homopolymers or complex resins as copolymers. Any of single phase structure type, core-shell type, and power feed type emulsions is suitable.

A hydrodispersible resin that has a hydrophilic group with self dispersiblity or no dispersibility while dispersibility is imparted to a surfactant or a resin having hydrophilic group can be used as the hydrodispersible resin. Among these, emulsions of resin particles obtained by emulsification polymerization or suspension polymerization of ionomers or unsaturated monomers of a polyester resin or polyurethane resin are most suitable.

In the case of emulsification polymerization of an unsaturated monomer, since a resin emulsion is obtained by reaction in water to which an unsaturated monomer, a polymerization initiator, a surfactant, a chain transfer agent, a chelate agent, pH adjusting agent, etc. are added, it is easy to obtain a hydrodispersible resin and change the resin components. Therefore, a hydrodispersible resin having target properties is easily obtained.

Specific examples of the unsaturated monomers include, but are not limited to, unsaturated carboxylic acids, mono-functional or poly-functional (meth)acrylic ester monomers, (meth)acrylic amide monomers, aromatic vinyl monomers, vinyl cyano compound monomers, vinyl monomers, arylated compound monomers, olefin monomers, dien monomers, and oligomers having unsaturated carbon. These can be used alone or in combination. When these are used in combination, resin properties can be easily reformed. The resin properties can be reformed by polymerization reaction and graft reaction using an oligomer type polymerization initiators.

Specific examples of the unsaturated carboxylic acids include, but are not limited to, acrylic acid, methacrylic acid, itaconic acid, fumaric acid, and maleic acid.

Specific examples of the mono-functional (meth)acrylic ester monomers include, but are not limited to, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyltrimethyl ammonium salts, 3-methcryloxy propyl trimethoxy silane, methyl acrylate, ethylacrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts.

Specific examples of poly-functional (meth)acrylic ester monomers include, but are not limited to, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, 2,2'-bis(4-methacryloxy diethoxyphenyl) propane, trimethylol propane trimethacrylate, trimethylol ethane trimethacrylate, polyethylene glycol diacrylate, triethylene glycol diacrylate, 1, 3-butylene glycol diacrylate, 1,4-butylene glycol diacrylate, 1, 6-hexane diol diacrylate, neopentyl glycol diacrylate, 1,9-nonane diol diacrylate, polypropylene glycol diacrylate, 2,2'-bis(4-acryloxy propyloxyphenyl)propane, 2,2'-bis(4-acryloxy diethoxyphenyl) propane trimethylol propane triacrylate, trimethylol ethane triacrylate, tetramethylol methane triacrylate, ditrimethylol tetraacryalte, tetramethylo methane tetraacrylate, pentaerythritol tetraacrylate, and dipentaerythritol hexaacrylate.

Specific examples of the (meth)acrylic monomers include, but are not limited to, acrylic amides, methacrylic amides, N,N-dimethyl acrylic amides, methylene bis acrylic amides, and 2-acrylic amide-2-methyl propane sulfonates.

Specific examples of the aromatic vinyl monomers include, but are not limited to, styrene, α-methylstyrene, vinyl toluene, 4-t-butyl styrene, chlorostyrene, vinyl anisole, vinyl naphthalene, and divinyl benzene.

Specific examples of the vinyl cyano compound monomers include, but are not limited to, acrylonitrile, and methacrylonitrile.

Specific examples of the vinyl monomers include, but are not limited to, vinyl acetate, vinylidene chloride, vinyl chloride, vinyl ether, vinyl ketone, vinyl pyrrolidone, vinyl sulfonic acid and its salts, vinyl trimethoxy silane, and vinyl triethoxy silane.

Specific examples of the arylated compound monomers include, but are not limited to, aryl sulfonic acid and its salts, aryl amine, aryl chloride, diaryl amine, and diaryl dimethyl ammonium salts.

Specific examples of the olefin monomers include, but are not limited to, ethylene and propylene.

Specific examples of the dien monomers include, but are not limited to, butadiene and chloroprene.

Specific examples of the oligomers having unsaturated carbon include, but are not limited to, styrene oligomers having a methacryloyl group, styrene-acrylonitrile oligomers having a methacryloyl group, methyl methacrylate oligomers having a methacryloyl group, dimethyl siloxane oligomers having a methacryloyl group, and polyester oligomers having an acryloyl group.

Since breaking in molecule chains such as dispersion destruction and hydrolytic cleavage occurs to the hydrodispersible resins in a strong alkali or strong acid environment, pH is preferably from 4 to 12, more preferably from 6 to 11, and furthermore preferably from 7 to 9 in terms of the miscibility with the hydrodispersible coloring agent.

The volume-average particle diameter (D50) of the hydrodispersible resin is related to the viscosity of the liquid dispersion. If the composition is the same, the viscosity at the same solid portion increases as the particle diameter decreases. To avoid preparing ink having an excessively high viscosity, the volume-average particle diameter (D50) of the hydrodispersible resin is preferably 50 nm or more. In addition, particles having a larger particle diameter than the size of the nozzle mouth of the inkjet head are not usable. When large particles smaller than the nozzle mouth are present in the ink, the discharging property of the ink deteriorates. The volume-average particle diameter (D50) of the hydrodispersible resin is preferably 200 nm or less and more preferably 150 nm or less in order not to degrade the discharging property.

In addition, preferably the hydrodispersible resin has a feature of fixing the hydrodispersible coloring agent on a recording medium (typically, paper) and forms a film at room temperature to improve the fixing property of the coloring material. Therefore, the minimum film-forming temperature (MFT) of the hydrodispersible resin is preferably 30° C. or lower. In addition, when the glass transition temperature of the hydrodisdpersible resin is too low (e.g., −40° C. or lower), the viscosity of the resin film tends to increase, thereby causing the obtained image sheet to increase tackiness. Therefore, the glass transition temperature of the hydrodisdpersible resin is preferably −40° C. or higher.

The ink preferably includes the hydrodisdpersible resin in an amount of from 2 to 30% by weight, and more preferably from 5 to 25% in a solid form.

The content of the solid portion in the coloring agent, the pigment in the coloring agent, and the hydrodisdpersible resin can be measured by, for example, a method of separating only the coloring agent and the hydrodisdpersible resin from the ink. When the pigment is used as the coloring agent, the ratio of the coloring agent to the hydrodisdpersible resin can be measured by evaluating the weight decreasing ratio by thermal weight analysis. In addition, when the molecule structure of the coloring agent is known, it is possible to quantify the solid portion of the coloring agent using NMR for pigments or dyes and fluorescent X ray analysis for heavy metal atoms and inorganic pigments, metal-containing organic pigments, and metal-containing dyes contained in the molecule structure.

There is no specific limit to the selection of the other components. Optionally, pH adjusting agents, antisepsis and anti-fungal agents, chelate reagents, anti-corrosion agents, anti-oxidants, ultraviolet absorbers, oxygen absorbers, and photostabilizing agents can be used in the ink of the present invention.

Any pH adjusters that can adjust pH of prescribed ink to be from 7 to 11 without having an adverse impact on the ink can be used. Specific examples thereof include, but are not limited to, alcohol amines, alkali metal hydroxides, ammonium hydroxides, phosphonium hydroxides, and alkali metal carbonates.

When the pH is too high or too low, the head of inkjet and an ink supplying unit tends to be dissolved, which results in modification, leakage, bad discharging performance of the ink, etc.

Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide, quaternary ammonium hydroxide, and quaternary phosphonium hydroxide.

Specific examples of the alkali metal carbonates include, but are not limited to, lithium carbonate, sodium carbonate, and potassium carbonate.

Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Specific examples of the chelate reagents include, but are not limited to, ethylene diamine sodium tetraacetate, nitrilo sodium triacetate, hydroxyethylethylene diamine sodium triacetate, diethylene triamine sodium quinternary acetate, and uramil sodium diacetate.

Specific examples of the anti-corrosion agents include, but are not limited to, acid sulfite, thiosodium sulfate, ammonium thiodiglycolate, diisopropyl ammonium nitride, pentaerythritol quaternary nitdride, and dicyclohexyl ammonium nitride.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Specific examples of the phenol-based anti-oxidants (including hindered phenol-based anti-oxidants) include, but are not limited to, butylated hydroxy anisol, 2,6-di-tert-butyl-4-ethylphenol, stearyl-$\beta$-(3,5-di-tert-butyl-4-hydroxyphenyl) propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis{1,1-dimethyl-2-[$\beta$-(3-tert-butyl-4-hydroxy-5-methylphenonOpropyonyloxy]ethyl}-2,4,8-10-tetraoxa spiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl)propionate]methane.

Specific examples of the amine-based anti-oxidants include, but are not limited to, phenyl-$\beta$-naphtylamine, $\alpha$-naphtyl amine, N,N'-di-sec-butyl-p-phenylene diamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxy anisole, 2,2'-methylenebis (4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate]methane, and 1,1,3-tris(2-methyl-4-hydroxy-5-tert-butylphenyl)butane.

Specific examples of the sulfur-based anti-oxidants include, but are not limited to, dilauryl-3,3'-thio dipropionate, distearyl thiodipropionate, laurylstearyl thiodipropionate, dimyristyl-3,3'-thiodipropionate, distearyl-$\beta,\beta$'-thiodipropionate, 2-mercaptobenzo imidazole, and dilauryl sulfide.

Specific examples of phosphorous-based anti-oxidants include, but are not limited to, triphenylphosphite, octadecylphosphite, triisodecylphosphite, trilauryltrithiophosphite, and trinonylphenyl phosphite.

Specific examples of the ultraviolet absorbers include, but are not limited to, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

Specific examples of the benzophenone-based ultraviolet absorbers include, but are not limited to, 2-hydroxy-4-n-octoxybenzophenone, 2-hydroxy-4-n-dodecyloxy benzophenone, 2,4-dihydroxy benzophenone, 2-hydroxy-4-methoxybenzophenone, and 2,2',44'-tetrahydroxy benzophenone.

Specific examples of the benzotriazole-based ultraviolet absorbers include, but are not limited to, 2-(2'-hydroxy-5'-tert-octylphenyl)benzo triazole, 2-(2'-hydroxy-5'-methylphenyl)benzo triazole, 2-(2'-hydroxy-4'-octoxyphenyl) benzo triazole, and 2-(2'-hydroxy-3'-tert-butyl-5'-methylphenyl)-5-chlorobenzo triazole.

Specific examples of the salicylate-based ultraviolet absorbers include, but are not limited to, phenyl salicylate, p-tert-butylphenyl salicylate, and p-octylphenyl salicylate.

Specific examples of the cyanoacrylate-based ultraviolet absorbers include, but are not limited to, ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Specific examples of the nickel complex salt-based ultraviolet absorbers include, but are not limited to, nickel-bis (octylphenyl)sulfide, 2,2'-thiobis(4-tert-octyl ferrate)-n-butylamine nickel (II), 2,2'-thiobis(4-tert-octyl ferrate)-2-ethylhexyl amine nickel (II), and 2,2'-thiobis(4-tert-octyl ferrate)triethanol amine nickel (II).

The ink for use in the present invention is prepared by dispersing or dissolving a colorant, a hydrosoluble organic solvent, a surfactant, and water with optional components such as a penetrant and a hydrodispersible resin dispersed or dissolved in an aqueous medium for use followed by stirring and mixing, if desired. Dispersion is conducted by a sand mill, a homogenizer, a ball mill, a paint shaker, an ultrasonic dispersing agent, etc. Stirring and mixing can be conducted by a stirrer having a stirring wing, a magnetic stirrer, a high speed disperser, etc.

The ink may be contained in a container such as an ink cartridge when used.

There is no specific limit to the characteristics of the ink for inkjet recording and any suitable ink can be selected. For example, the viscosity and the surface tension with in the following ranges are preferable.

The ink preferably has a viscosity of from 5 to 25 mPa·s at 25° C. When the ink viscosity is 5 mPa·s or greater, the printing density and the printing quality are improved. When the ink viscosity is 25 mPa·s or less, a suitable ink discharging property is secured.

The viscosity can be measured by a viscometer (RE-550L, from TOKI SANGYO CO., LTD.) at 25° C.

The ink preferably has a static surface tension of 30 mN/m or less, and more preferably 28 mN/m or less at 25° C. When 30 mN/m or less, the penetration improves and the beading decreases, and the ink dries well on plain papers. When greater than 30 mN/m, the leveling of the ink on a recording medium tends to hardly occur, thereby prolonging the drying time.

The ink can used in any printers such as a piezoelectric element type in which ink droplets are discharged by transforming a vibration plate forming the wall of the ink flowing route using a piezoelectric element as a pressure generating device to press the ink in the ink flowing route as described in JP-H2-51734-A; a thermal type in which bubbles are produced by heating ink in the ink flowing route with a heat element as described in JP-S61-59911-A; and an electrostatic type in which ink droplets are discharged by transforming a vibration plate by a force of electrostatic generated between the vibration plate and the electrode while the vibration plate and the electrode are provided facing each other as described in JP-H6-71882-A The pretreatment liquid for use in the present invention includes at least water and a hydrosoluble aliphatic organic acid, and a hydrosoluble organic monoamine compound, an organic acid ammonium salt, a hydrosoluble cationic polymer, an aliphatic organic acid salt compound, an inorganic metal salt compound, a hydrosoluble organic solvent, a surfactant, a penetrant, etc. when necessary.

The hydrosoluble aliphatic organic acid agglutinates a hydrodispersible colorant, which means the hydrodispersible colorants are adsorbed to each other. This can be observed by a particle diameter distribution measurer.

When an ionic material such as the hydrosoluble aliphatic organic acid is added to the pretreatment liquid, an ion is adsorbed to a charge on the surface of the hydrodispersible colorant and the surface charge is neutralized. Therefore, the intermolecular agglutination is strengthened and the hydrodispersible colorants agglutinate. To observe the agglutination, when 30 mL of the pretreatment liquid are added to 5 μL of the ink including the hydrodispersible colorants in an amount of 5% by weight, whether the colorants instantly agglutinates is observed.

As the hydrosoluble aliphatic organic acid, an organic acid including a hydrosoluble aliphatic carboxylic group and an organic acid including a hydrosoluble aliphatic sulfonic acid group are preferably used. The fatty acid means a straight-chain or a branched-chain hydrocarbon group is included, and the hydrocarbon group may be a saturate or an unsaturated hydrocarbon group. The number of carbon atoms of the hydrosoluble aliphatic organic acid is not particularly limited, but in terms of solubility in a solvent, 2 to 6 are preferable, and 2 to 4 are more preferable per one molecule. The number of an acidic group of the hydrosoluble aliphatic organic acid is, in terms of image density, preferably 3 or less, more preferably 2 or less, and furthermore preferably 1 per one molecule. As the hydrosoluble aliphatic organic acid, an organic acid including a hydrosoluble aliphatic carboxylic group having the following formula (V) is preferably used.

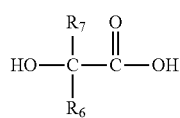

(V)

wherein $R_6$ represents a hydrogen atom or a methyl group substituted by a carboxyl group; and $R_7$ represents a methyl group, a methyl group substituted by a carboxyl group, or a methyl group substituted by a hydroxyl group and a carboxyl group.

Examples of the compounds having the formula (V) include lactic acid (pKa: 3.83), malic acid (pKa: 3.4), citric acid (pKa: 3.13), and tartaric acid (pKa: 2.93).

Examples of the carboxyl group-containing hydrosoluble aliphatic organic acids other than the compounds having the formula (V) include gluconic acid (pKa: 2.2), pyruvic acid (pKa: 2.49), and fumaric acid (pKa: 3.02).

As the sulfo group-containing hydrosoluble aliphatic organic acid, taurine is preferably used.

The pretreatment liquid preferably includes the hydrosoluble aliphatic organic acid in an amount of from 1 to 40% by weight, and more preferably from 3 to 30% by weight. When greater than 40% by weight, it may be difficult to add hydrosoluble organic monoamine in an amount required for neutralization due to the formulation of the pretreatment liquid. When less than 1% by weight, the effect of improving image quality may be reduced.

The pretreatment liquid for use in the present invention preferably includes a hydrosoluble organic monoamine compound with a view to control the penetration of ink and to prevent corrosion of metal.

The hydrosoluble organic monoamine compounds may be any of primary, secondary, tertiary, quaternary amines and salts thereof. Note that in the present invention, the term quaternary amine means a compound in which a nitrogen atom is substituted with four alkyl groups. The number of carbon atoms in the hydrosoluble organic monoamine compound is not particularly limited, however, it is preferably, in terms of the solubility in solvents, 2 to 12 per molecule, and more preferably 2 to 6 per molecule.

As the hydrosoluble organic monoamine compounds, compounds having the following formula (VI) or (VII) are preferably used.

(VI)

wherein $R^8$, $R^9$, and $R^{10}$ independently represent a hydrogen atom, an alkoxy group having 1 to 4 carbon atoms, an alkyl group having 1 to 8 carbon atoms, a hydroxyethyl group or a hydroxypropyl group. However, a case where all of $R^8$, $R^9$, and $R^{10}$ are hydrogen atoms is excluded.

(VII)

wherein $R^{11}$ represents a hydroxymethyl group; $R^{12}$ represents a methyl group, an ethyl group or a hydroxymethyl group; and $R^{13}$ denotes a hydrogen atom, an alkyl group having 1 to 4 carbon atoms or a hydroxymethyl group.

Specific examples of the compounds having the formula (VI) include dimethylamine, ethylamine, diethylamine, triethylamine, propylamine, dipropylamine, isopropylamine, diisopropylamine, n-butylamine, sec-butylamine, t-butylamine, di-n-butylamine, tributylamine, pentylamine, dipentylamine, tripentylamine, 2-ethylhexylamine, di-2-ethylhexylamine, di-n-octylamine, tri-n-octylamine, 1-amino-2-propanol, 3-amino-1-propanol, N-methylethanolamine, N,N-dimethylethanolamine, N-methyldiethanolamine, diethanolamine, triethanolamine, triisopropanolamine, N-butyldiethanolamine, and N,N-dibutylethanolamine.

Specific examples of the compounds having the formula (VII) include 2-amino-2-ethyl-1,3-propanediol, 2-amino-2-(hydroxymethyl)-1,3-propanediol, 2-amino-2-methyl-1,3-propanediol, and 2-amino-2-methyl-1-propanol.

Specific examples of the hydrosoluble organic monoamine compounds other than the compounds having the formulae (VI) or (VII) include allylamine, diallylamine, 3-ethoxypropylamine, 2-(2-aminoethoxy)ethanol, 3-methoxypropylamine, and choline.

The content of the hydrosoluble organic monoamine compound is preferably 1.0 mol to 1.5 mol, and more preferably 1.0 mol to 1.2 mol relative to 1 mol of the acid group contained in the hydrosoluble aliphatic organic acid. When the amount added of the hydrosoluble organic monoamine compound is less than 1.0 mol, white streaks may occur due to dot shrinkage of an image formed matter. When the amount added of the hydrosoluble organic monoamine compound is more than 1.5 mol, the hydrosoluble organic monoamine compound released in the treatment liquid may accelerate permeation of the inkjet ink to cause a decrease in image density.

Since the hydrosoluble organic monoamine compound is necessary for producing a salt neutralized together with the hydrosoluble aliphatic organic acid and it is important for the pretreatment liquid to have a pH of 5 or higher, it is necessary to suitably control the amount of the hydrosoluble organic monoamine compound according to the molecular weight of the hydrosoluble organic monoamine compound or hydrosoluble aliphatic organic acid.

The pretreatment liquid may include an organic acid ammonium salt together with or instead of the hydrosoluble aliphatic organic acid, which has the same effect as that of the hydrosoluble aliphatic organic acid.

The organic acid ammonium salt having the following formula is used for the reasons of solubility to water, balance of the extent of acidity or basicity of individual ions dissociated, ease of forming chelates, etc. The number of carbon atoms of the organic ammonium salt is not particularly limited, however, from the viewpoint of solubility to water, it is preferably 6 per molecule or less. The organic ammonium salt is not particularly limited and may be suitably selected in accordance with the intended use. It is, however, preferably a lactic acid ammonium salt. The pretreatment liquid preferably includes the organic ammonium salt in an mount of from 1 to 40% by weight, and more preferably from 3 to 30% by weight. When greater than 40% by weight, the effect of improving the quality of a recorded image in commensurate with the increased content may not change, and the viscosity of the liquid composition may increase. When less than 1% by weight, there is a potential that the effect of improving the quality of an image is reduced.

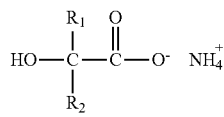

wherein $R_1$ and $R_2$ represent a lower alkyl group.

The pretreatment liquid may include a hydrosoluble cationic polymer together with or instead of the hydrosoluble aliphatic organic acid, which has the same effect as that of the hydrosoluble aliphatic organic acid.

Specific examples of the hydrosoluble cationic polymer include a polyamine-epihalohydrin copolymer, a polyamide-epihalohydrin copolymer, a polyamidepolyamine-epihalohydrin copolymer, an amine-epihalohydrin copolymer. Among these, at least one selected from a copolymer having the following formula (VIII), a copolymer having a repeating unit having the following formula (IX), and a copolymer obtained by polymerizing an amine monomer having the following formula (X), a monomer having the following formula (XI) and a monomer having the following formula (XII) is more preferable.

Specific examples of the amine monomer include diethylenetriamine, triethylenetetramine, and tetraethylenepentamine, and iminobispropylamine. The monomer having the following formula (X) is preferable, because it is industrially produced and easily obtainable. Note that as the above-described hydrosoluble cationic polymer, other than the above exemplary compounds, a quaternary ammonium salt type cationic polymer, or in some cases a hydrodispersible cationic polymer may be used.

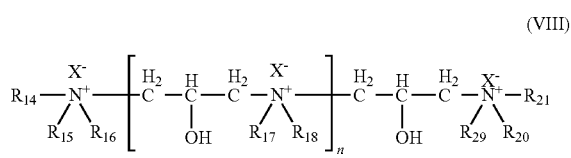

(VIII)

wherein $R_{14}$ to $R_{21}$ may be identical to or different from each other, and each represents at least one of an alkyl group having 1 to 8 carbon atoms, a hydroxyalkyl group, an alkenyl group, and a benzyl group; X represents a halogen atom; and n represents an integer of from 10 to 4.

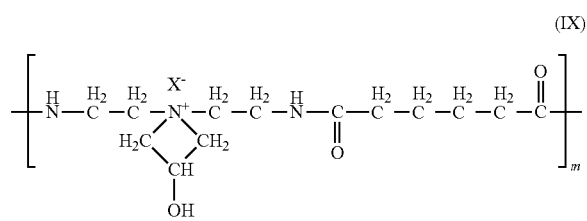

(IX)

wherein X represents a halogen atom and m represents an integer of 1 or more.

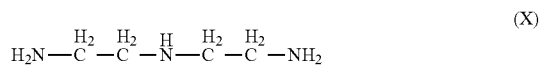

(X)

(XI)

(XII)

wherein X represents a halogen atom.

The hydrosoluble cationic polymer is obtained by known methods such as a method for polymerizing a monomer containing epihalohydrin and at least one of amine and amide, a method for graft polymerization of a monomer containing epihalohydrin with polyamide which is obtained by polymerizing a monomer containing amine and carboxylic acid. The weight average molecular weight of the hydrosoluble cationic polymer differs depending on types of copolymers. In the case of the polyamine-epihalohydrin copolymer, the weight average molecular weight of the hydrosoluble cationic polymer is preferably 500 to 100,000. In the case of the polyamide-epihalohydrin copolymer or the polyamidepolyamine-epihalohydrin copolymer, the weight average molecular weight of the hydrosoluble cationic polymer is preferably 5,000,000 or less. In the case of the polyamine-epihalohydrin copolymer, the weight average molecular weight of the hydrosoluble cationic polymer is preferably 700 to 50,000. When the weight average molecular weight is more than the maximum value of each copolymer, an aqueous solution may not be formed. When the weight average molecular weight is less than the minimum value of each copolymer, effect of treatment with the liquid composition may be decreased.

The content the hydrosoluble cationic polymer is not particularly limited and may be suitably selected in accordance with the intended use. The pretreatment liquid preferably includes the hydrosoluble cationic polymer in an amount of from 1 to 40% by weight, and more preferably from 3 to 30% by weight. When greater than 40% by weight, the effect of improving the quality of an image in commensurate with the increased content may not change, and the viscosity of the liquid composition may excessively increase. When less than 1% by weight, there is a possibility that the effect of improving the quality of an image is reduced.

When an aliphatic organic acid salt compound or an inorganic metal salt compound is added to the pretreatment liquid, the pigment is likely to remain on the surface of a recording medium to enhance the salting-out effect, whereby the image density can be increased.

Specific examples of the aliphatic organic acid salt compound of the organic acid include sodium L-aspartate, magnesium L-aspartate, calcium ascorbate, sodium L-ascorbate, sodium succinate, disodium succinate, diammonium succinate, aluminum citrate, potassium citrate, calcium citrate, tripotassium citrate, trisodium citrate, triammonium citrate, disodium citrate, diammonium citrate, sodium lactate, potassium lactate, calcium lactate, magnesium lactate, aluminum lactate, ammonium lactate, zinc lactate, potassium tartrate, calcium tartrate, sodium DL-tartrate, and sodium potassium tartrate.

Specific examples of the inorganic metal salt compound include magnesium sulfate, aluminum sulfate, manganese sulfate, nickel sulfate, iron(II) sulfate, copper (II) sulfate, zinc sulfate, iron(II) nitrate, iron(III) nitrate, cobalt nitrate, calcium nitrate, strontium nitrate, copper(II) nitrate, nickel(II) nitrate, zinc(II) nitrate, manganese (II) nitrate, nickel(II) chloride, calcium chloride, tin(II) chloride, strontium chloride, barium chloride, and magnesium chloride, sodium sulfate, potassium sulfate, lithium sulfate, sodium hydrogen sulfate, potassium hydrogen sulfate, sodium nitrate, potassium nitrate, sodium carbonate, potassium carbonate, sodium carbonate, potassium hydrogen carbonate, sodium chloride, and potassium chloride.

The pretreatment liquid preferably includes the aliphatic organic acid salt compound or the inorganic metal salt compound in an amount of from 0.1 to 30% by weight, and more preferably 1 to 20% by weight. When greater than 30% by weight, the aliphatic organic acid salt compound may be insufficiently dissolved in the pretreatment liquid and precipitated. When less than 0.1% by weight, the effect of improving image density may be reduced.

The pretreatment liquid preferably includes a hydrosoluble organic solvent with a view to control the permeability of ink and to prevent corrosion of metal. Specific examples of the hydrosoluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate.

The hydrosoluble organic solvents retain a large amount of water therein even when the water in the pretreatment liquid evaporates and reaches an equilibrium state, thereby imparting flowability to the pretreatment liquid. In this case, by using a hydrosoluble organic solvent having a high equilibrium water content as the hydrosoluble organic solvent, it is possible to prevent an excessive increase in viscosity of the ink even when the water in the inkjet treatment liquid evaporates and reaches an equilibrium state.

As the hydrosoluble organic solvent having a high-equilibrium water content, hydrosoluble organic solvent having an equilibrium water content of 30% by weight or more is preferable, 40% by weight or more is more preferable, at a temperature of 23° C. and 80% RH.

The content of the hydrosoluble organic solvent included in the pretreatment liquid is suitably selected depending on the intended purpose without any restriction. It is preferably from 10 to 80% by weight, and more preferably from 15 to 60% by weight. When greater than 80% by weight, the recording medium after pretreatment may be hard to be dried depending on the type of the hydrosoluble organic solvent. When less than 10% by weight, water in the pretreatment liquid evaporates in the pretreatment liquid application step, etc., possibly causing significant change in the composition of the pretreatment liquid.

The pretreatment liquid may include a surfactant for improving the wettability of the surface of recording medium, and the image density and color saturation of image formed matters and reducing white spots therein. In this case, to improve the wettability of the surface of recording medium and the ink permeability, it is preferable to adjust the static surface tension of the pretreatment liquid to 30 mN/m or lower with the surfactant.

Specific examples of the surfactant include nonionic surfactants, anionic surfactants, betaine surfactant, silicone surfactants, and fluorochemical surfactants. Particularly, silicone surfactants and fluorochemical surfactants, each of which can reduce the static surface tension to 30 mN/m or lower, are preferably used. These surfactants may be used alone or in combination.

The pretreatment liquid preferably includes the surfactant in an amount of from 0.001 to 5% by weight, and more preferably of from 0.05 to 1% by weight. When less than 0.001% by weight, an obtainable effect by adding the surfactant may be small. When greater than 5% by weight, any improvement cannot be attained in enhancing the effect of the surfactant by increasing the amount to be added.

The pretreatment liquid preferably includes the at least one selected from the group consisting of a non-wettable C8-11 polyol compound and a glycol ether compound, as a penetrant as the ink does. The definition of the non-wettability, preferable penetrants, other non-wettable polyol compounds and other penetrants which can be used together are the same as those of the ink.

The pretreatment liquid preferably includes the penetrant in an amount of from 0.1 to 5.0% by weight. When less than 0.1% by weight, the penetrant may not give the effect of making the pre-treatment liquid penetrate. When greater than 5.0% by weight, a part of the penetrant is separated from the solvent as the penetrant has low solubility to the solvent, and therefore the effect of improving penetration of the pretreatment liquid may be saturated.

The pretreatment liquid may include other components such as the antiseptic agent and the anti-rust agent which are the same as those used in the ink.

Various recording media such as plain papers, glossy papers, special papers, clothes, films OHP sheets and general print papers can be used. These can be used alone or in combination.

However, general print papers having a specific liquid absorbing property need to be used to form images having good image quality such as image density, color saturation, beading and color bleed, high glossiness and good fixability. Specifically, a recording medium pure water transfers thereto in an amount of from 1 to 15 mL/m$^2$, and preferably from 2 to 13 mL/m$^2$ at a contact time of 100 ms when measured by a dynamic scanning absorptometer is used. When too low, beading and color bleed tend to occur. When too much, an ink dot diameter after recorded is smaller than desired and a solid image cannot be formed occasionally.

The dynamic scanning absorptometer can precisely measure a liquid absorption for quite a short time. The apparatus (i) directly reads liquid absorption velocity from movement of meniscus in a capillary, (ii) forms a sample into a disc and spirally scans a liquid absorption head thereon. The scanning speed is automatically changed according to a predetermined pattern to measure only the points needed, i.e., the measurement is automated. A liquid feed head to a paper sample is connected to the capillary through a TEFLON tube, and the meniscus position in the capillary is automatically read by an optical sensor. Specifically, a dynamic scanning absorptometer (K350 series D from Kyowa Co., Ltd.) is used to measure transfer amount of pure water. The transfer amount at a contact time of 100 ms can be measured by interpolating a measured value of a transfer amount at a neighboring contact time of each contact time.

Marketed products of print papers having the specific liquid absorbing property include Ricoh Business Coat Gloss 100 from Ricoh Company, Ltd; OK Top Coat +, OK Kinfuji + and SA Kinfuji + from Oji Paper Co., Ltd.; Super MI Dull, Aurora Coat and Space DX from Nippon Paper Industries, Co., Ltd.; α Mat and μ Coat from Hokuetsu paper Mills, Ltd.; Raicho Art and Raicho Super Art from Chuetsu Pulp & Paper Co., Ltd.; Pearl Coat from Mitsubishi Paper Mills Ltd., etc.

In addition, the print paper having the specific liquid absorbing property preferably has a coated layer at least on one surface thereof.

An image forming method of the present invention includes a pretreatment step of applying a pretreatment liquid to a recording medium, an ink jetting step of applying a stimulus to an inkjet ink to jet the inkjet ink onto the recording medium, onto which the pretreatment liquid has been applied, so as to form an image on the recording medium. The retreatment step may coat or jet the pretreatment liquid.

The pretreatment step is suitably selected without any restriction, provided that the step is performed in accordance with a method which can uniformly apply and deposit the pretreatment liquid on a surface of a recording medium. Examples of such method include blade coating, gravure coating, gravure off-set coating, bar coating, roller coating, knife coating, air knife coating, comma roller coating, U-comma roller coating, AKKU coating, smoothing coating, micro gravure coating, reverse roller coating, 4- or 5-roll coating, dip coating, curtain coating, slide coating, and die coating.

The pretreatment may be carried out on a recording medium whose surface is sufficiently dry or on a recording medium whose surface is being dried, since the effect of the pretreatment can be exhibited. Note that the recording medium that has been subjected to the pretreatment may be dried if necessary. In this case, the recording medium may be dried by an infrared dryer, a microwave drier, a roll heater, drum heater, or hot air.

In the pretreatment step, an adhesion amount of the pretreatment liquid to the recording medium is from 0.1 to 30.0 g/m$^2$, more preferably from 0.2 to 10.0 g/m$^2$ on wet basis (i.e. the adhesion amount of the pre-treatment liquid on the recording medium before being dried). When less than 0.1 g/m$^2$ on wet basis, qualities (e.g. density, saturation, resistance to beading, and resistance to color bleeding) of an image of the formed matter may remain the same to the level of the formed matter obtained by the conventional methods. When greater than 30.0 g/m$^2$, the drying properties of the pre-treatment liquid degrades, or curling of the formed matter may be caused.

The ink jetting step in the image forming method of the present invention is applying a stimulus (energy) to an ink to jet the ink onto the recording medium, onto which the pretreatment liquid has been applied, so as to form an image on the recording medium. As the method for applying stimulus (energy) to an ink so as to form an image on a recording medium various inkjet recording methods known in the art can be used. Examples of such inkjet recording method include an inkjet recording method of head-scanning system, and an inkjet recording method in which an image is recorded on a certain sheet-shaped recording medium using aligned heads.

In the ink jetting step, the driving system of a recording head, which is a unit for jetting the ink, is not particularly restricted. Examples of the driving system include a system using a piezoelectric element actuator using lead zirconate titanate (PZT); a system for functioning thermal energy; a system for using an on-demand head utilizing actuator or the like using electrostatic force; and a system in which a charge-controlling continuous jetting head is used for recording.

In the image forming method of the present invention, a heating and drying step may be made to recoding media an ink is jetted to when necessary. In this case, print papers can be dried by an infrared dryer, a microwave drier, a roll heater, drum heater, or hot air. Further, as a method of smoothing the surface of an image and fixing the image, a heat fixing step may be made to fix the image with a heat at 100 to 150° C. The fixing step improves glossiness and fixability of recorded images. As a heater, a roll heater or a drum heater, etc. having a heated mirror surface is preferably used. The mirror (smooth) surface of the roll heater or the drum heater can contact the surface of an image. A fixing roller heated to have a temperature of from 100 to 150° C. is preferably used in consideration of image quality, safety and economic efficiency.

The pretreatment step is preferably continuously performed at a constant linear speed of 10 mm/s to 5,000 mm/s. In order to perform this step at such speed, in the aforementioned examples of the recording apparatus, a recording medium in the form of a sheet is used, and an operation of applying an ink to a certain recording medium by the inkjet recording method, so as to form an image is started after an operation of applying the pretreatment liquid to such recording medium is completed. In such recording apparatus, the speed of applying the pretreatment liquid and the speed of recording an image are not matched in most of cases, there is a difference in time from when the pretreatment liquid is applied to when an image is recorded between the recording starting point of a certain sheet and the recording end point of the sheet. Even if this difference is significant, it is possible to substantially prevent evaporation of water from the pretreatment liquid, as the pretreatment liquid contains a large amount of a hydrophilic solvent having a boiling point higher than that of water and slow evaporation speed, and having an adjusted water ratio close to an equilibrium water content in the air under an environment where a printer is used. Therefore, the difference in image quality caused between the recording start portion and the recording end portion of the sheet of the recording medium can be lowered to at least the level or lower where such a difference can be visually observed.

As is evident from the conveying process of a recording medium in this apparatus, in most cases, a recording medium is necessary to be conveyed with members in contact with the recording medium coated with a pretreatment liquid, such as rollers, roller bearings, and guides, after application of the pretreatment liquid onto the recording medium. In this case, if the pretreatment liquid applied to a recording medium is transferred to conveying members of the recording medium, conveying functions may be damaged, and smear may accumulate thereon, causing degradation of image quality. The occurrence of such problem can be prevented by using members, for example, a guide of a wave-shaped plate, a spur-shaped roller bearing, and a roller whose surface is made of a water-repellent material.

However, it is desirable that the pretreatment liquid applied to a recording medium be quickly absorbed into the recording medium and the surface of recording medium appears dry. To achieve this object, it is effective to adjust the surface tension of the pretreatment liquid to 30 mN/m or lower, so that the liquid is quickly absorbed into the recording medium. The "drying and solidifying" of the pretreatment liquid that has been applied to a recording medium does not mean that the pretreatment liquid is absorbed into the recording medium and the surface of the recording medium appears dry as described above, but means that liquid compounds in the pretreatment liquid, such as water, evaporates and cannot maintain a liquid state, followed by solidifying. Even if the pretreatment liquid of the present invention is absorbed into a recording medium and the surface thereof appears dry by using the pretreatment liquid in a recording apparatus including a combination of an inkjet treatment liquid application unit and an image recording apparatus as described above, inkjet recording can be performed with a state where the pretreatment liquid is not actually solidified, and the image quality can be remarkably improved with an extremely small amount of the pretreatment liquid to be applied.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Examples 1 to 27 and Comparative Examples 1 to 12

<Preparation of Inkjet Ink>

Preparation Example 1

—Preparation of Hydrosoluble Polymeric Compound Aqueous Solution A—

Materials formed of the following compositions (1) to (3) were heated and stirred with a stirrer to dissolve a copolymer in (1), and a small amount of insoluble matter is filtered with a filter having an average pore diameter of 5 μm to prepare a hydrosoluble polymeric compound aqueous solution A.

<Composition>

(1) α-olefin-maleic anhydride copolymer having the following formula (T-YP 112 from Seiko PMC Corp (R represents an alkyl group having 18 to 22 carbon atoms and n represents an integer of from 30 to 100), an acid value of 190 mgKOH/g and a weight-average molecular weight of 100,000) 10.0 parts

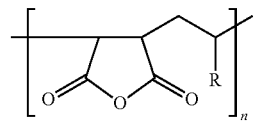

(2) 1N—LiOH aqueous solution • • • 17.34 parts (1.2 times in acid value of that of α-olefin-maleic anhydride copolymer having the above-mentioned formula)

(3) Ion-exchanged water • • • 72.66 parts

The α-olefin-maleic anhydride copolymer in (1) is synthesized with olefin having 20 to 24 carbon atoms, and the resultant copolymer is a copolymer an alkyl group (R) having 18 to 22 carbon atoms except for two carbon atoms forming a double bond is introduced to its polymer chain, <Measurement of Weight Average Molecular Weight>

The weight average molecular weight of the α-olefin-maleic anhydride copolymer in (1) is measured as follows.

First, the copolymer is dissolved in tetrahydrofuran, and KF-806L (for THF) is used as a GPC column. As a standard material for molecular weight, three polystyrenes having different molecular weights, which have been known in advance (molecular weight of 1,000, 2,400 and 8,500), are measured to preliminarily form a calibration curve.

The copolymer is measured by GPC, and from a graph reflecting the resultant SEC chromatogram, the resultant differential molecular weight distribution curve, and the calibration curve obtained using the standard material for molecular weight, a weight average molecular weight of the copolymer can be calculated.

Preparation Example 2

—Preparation of Surface-Treated Black Pigment Dispersion—

Ninety (90) g of carbon black having a CTAB specific surface area of 150 m²/g and an DBP oil absorption amount of 100 ml/100 g was added to 3,000 ml of 2.5 normal sodium sulfate solution and conduct reaction of oxidation treatment by stirring at 300 rpm at 60° C. for 10 hours. The reaction liquid was filtered, and the filtered carbon black was neutralized by sodium hydroxide followed by ultra-filtration.

The thus-obtained carbon black was washed with water. The carbon black was dispersed in pure water such that the solid portion of the carbon black is 30% by weight followed by sufficient stirring to obtain q liquid dispersion of black pigment. The volume-average particle diameter (D50) of the pigment dispersion in the liquid dispersion of black pigment is 103 nm. The volume-average particle diameter (D50) is measured by particle size distribution measuring instrument (Nanotrac UPA-EX-150, from Nikkiso Co., Ltd.)

Preparation Example 3

<Preparation of Particulate Polymer Dispersion Including Magenta Pigment>
—Preparation of Polymer Solution A—

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed in the flask and heated to 65° C. A liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile and 18.0 g of methyl ethyl ketone was dripped in the flask in 2.5 hrs. Subsequently, a liquid mixture of 0.8 g of azobis dim ethyl valeronitrile and 18.0 g of methyl ethyl ketone was dripped into the flask in 0.5 hrs. After 1 hr aging at 65° C., 0.8 g of azobisdimethyl valeronitrile was added, followed by further 1 hr aging. After the reaction was completed, 364 g of methyl ethyl ketone was added into the flask to obtain 800 g of polymer solution A having a concentration of 50% by weight.
—Preparation of Particulate Polymer Dispersion Including Magenta Pigment—

Twenty-eight (28) g of the polymer solution A, 42 g of C.I. Pigment Red 122, 13.6 g of 1 mol/l potassium hydroxide solution, 20.0 g of methyl ethyl ketone, and 13.6 g of ion-exchanged water were fully mixed and kneaded using a roll mill. The obtained paste was placed in 200 g of pure water followed by sufficient stirring. Methyl ethyl ketone and water were distilled away using an evaporator and coarse particles were removed by filtrating the thus-obtained liquid dispersion with a polyvinylidene fluoride membrane filter having an average hole diameter of 5.0 μm under pressure to obtain a dispersion of particulate polymer including magenta pigment including the pigment in an amount of 15% by weight and a solid content of 20% by weight. The volume-average particle diameter (D50) of the particulate polymer including magenta pigment in the dispersion was 127 nm when measured as it was in Preparation Example 2.

Preparation Example 4

—Preparation of Particulate Polymer Dispersion Including Cyan Pigment—

The procedure for preparation of the particulate polymer dispersion in Preparation Example 3 was repeated to prepare a particulate polymer dispersion including cyan pigment except for replacing the pigment with a phthalocyanine pigment (C.I. Pigment Blue 15:3). The volume-average particle diameter (D50) of the particulate polymer in the dispersion was 93 nm when measured as it was in Preparation Example 2.

Preparation Example 5

—Preparation of Particulate Polymer Dispersion Including Yellow Pigment—

The procedure for preparation of the particulate polymer dispersion in Preparation Example 3 was repeated to prepare a particulate polymer dispersion including cyan pigment except for replacing the pigment with a monoazo yellow pigment (C.I. Pigment Yellow 74). The volume-average particle diameter (D50) of the particulate polymer in the dispersion was 76 nm when measured as it was in Preparation Example 2.

Preparation Example 6

—Preparation of Particulate Polymer Dispersion Including Carbon Black Pigment—

The procedure for preparation of the particulate polymer dispersion in Preparation Example 3 was repeated to prepare a particulate polymer dispersion including cyan pigment except for replacing the pigment with a carbon black (FW100, from Degussa AG). The volume-average particle diameter (D50) of the particulate polymer in the dispersion was 104 nm when measured as it was in Preparation Example 2.

Preparation Example 7

—Preparation of Yellow Pigment Surfactant Dispersion—
(1) Monoazo yellow pigment (C.I. Pigment Yellow 74 from Dainichiseika Color & Chemicals Mfg. Co., Ltd.) • • • 30.0 parts
(2) Polyoxyethylene styrene phenyl ether (nonionic surfactant Noigen EA-177 having an HLB value of 15.7 from Dai-Ichi Kogyo Seiyaku Co., Ltd.) • • • 10.0 parts
(3) Ion-exchanged water • • • 60.0 parts The surfactant (2) specified above was dissolved in the ion-exchanged water (3) followed by mixing with the pigment (1) specified above. Subsequent to sufficient moistening, the resultant was dispersed with a wet type disperser (Dyno-Mill KDL A type from WAB AG) in which zirconia beads having a diameter of 0.5 mm were filled with at 2,000 rpm for 2 hrs to obtain a primary pigment dispersion. Then, 4.26 parts of hydrosoluble polyurethane resin (Takelac W-5661 from Mitsui Chemicals, Inc., having an effective component of 35.2% by weight, an acid value of 40 mgKOH/g and a weight-average molecular weight of 18,000) were added thereto followed by sufficient stirring to obtain a yellow pigment surfactant dispersion. The volume-average particle diameter (D50) of the pigment in the dispersion was 62 nm when measured as it was in Preparation Example 2.

Preparation Example 8

—Preparation of Magenta Pigment Surfactant Dispersion—
(1) Quinacridone pigment (C.I. Pigment Red 122 from Dainichiseika Color & Chemicals Mfg. Co., Ltd.) • • • 30.0 parts
(2) Polyoxyethylene-β-naphthylether (nonionic surfactant RT-100 from Takemoto Oil & Fat Co., Ltd., having an HLB value of 18.5) • • • 10.0 parts
(3) Ion-exchanged water • • • 60.0 parts The surfactant (2) specified above was dissolved in the ion-exchanged water (3) followed by mixing with the pigment (1) specified above. Subsequent to sufficient moistening, the resultant was dispersed with a wet type disperser (Dyno-Mill KDL A type from WAB AG) in which zirconia beads having a diameter of 0.5 mm were filled with at 2,000 rpm for 2 hrs to obtain a primary pigment dispersion. Then, 7.14 parts of hydrosoluble of a hydrosoluble styrene-(meth)acrylic acid copolymer (JC-05 from Seiko PMC Corp., having an effective component of 21% by weight, an acid value of 170 mgKOH/g and a weight-average molecular weight of 16,000) were added thereto followed by sufficient stirring to obtain a yellow pigment surfactant dispersion. The volume-average particle diameter (D50) of the pigment in the dispersion was 83 nm when measured as it was in Preparation Example 2.

Preparation Example 9

—Preparation of Cyan Pigment Surfactant Dispersion—
(1) Phthalocyanine pigment (C.I. Pigment Blue 15:3 from Dainichiseika Color & Chemicals Mfg. Co., Ltd.) • • • 30.0 parts
(2) Polyoxyethylene styrene phenyl ether (a nonionic surfactant from Dai-Ichi Kogyo Seiyaku Co., Ltd., Noigen EA-177 having an HLB value of 15.7) • • • 10.0 parts
(3) Ion-exchanged water • • • 60.0 parts The surfactant (2) specified above was dissolved in the ion-exchanged water (3) followed by mixing with the pigment (1) specified above. Subsequent to sufficient moistening, the resultant was dispersed with a wet type disperser (Dyno-Mill KDL A type from WAB AG) in which zirconia beads having a diameter of 0.5 mm were filled with at 2,000 rpm for 2 hrs to obtain a primary pigment dispersion. Then, 7.51 parts of the hydrosoluble polymeric compound aqueous solution A prepared in Preparation Example 1 and 2.51 parts of a hydrosoluble polyester resin (Nichigo POLYESTER W-0030 from The Nippon Synthetic Chemical Industry Co., Ltd., having an effective component of 29.9% by weight, an acid value of 100 mgKOH/g and a weight-average molecular weight of 7,000) were added thereto followed by sufficient stirring to obtain a yellow pigment surfactant dispersion. The volume-average particle diameter (D50) of the pigment in the dispersion was 78 nm when measured as it was in Preparation Example 2.

Production Examples 1 to 31

—Production of Inks 1 to 31—

First, as Tables 1-1 to 1-5 show, a hydrosoluble organic solvent [the compounds having the formulae (I) to (IV), the amide compound having the formula (I-2), alkylalkanediol, polyol], a penetrant, a surfactant, an mildew proofing agent and water were mixed and stirred for 1 hour so as to be uniformly mixed. In addition, depending on the mixture liquid, a hydrodispersible resin was added, and stirred for 1 hour, followed by adding the pigment dispersion, a defoaming agent and a pH adjuster to the mixture liquid and stirring for 1 hour. This dispersion was filtered under pressure through a polyvinylidene fluoride-membrane filter having an average pore diameter of 5.0 μm to remove coarse particles and foreign particles therefrom, to thereby produce each of inks 1 to 31.

TABLE 1-1

| | Component (% by weight) | | Ink 1 |
|---|---|---|---|
| Pigment dispersion | Preparation Example 2 | | — |
| | Preparation Example 3 | | — |
| | Preparation Example 4 | | — |
| | Preparation Example 5 | | — |
| | Preparation Example 6 | | 50.00 |
| | Preparation Example 7 | | — |
| | Preparation Example 8 | | — |
| | Preparation Example 9 | | — |
| Hydro-dispersible resin | Acrylic-silicone resin emulsion | | — |
| | Polyurethane emulsion | | — |
| Hydrosoluble organic solvent | Formulae (I) to (IV) | Compound having formula (I-3) | 10.00 |
| | | Compound having formula (II-2) | — |
| | | Compound having formula (III-2) | 10.00 |
| | | Compound having formula (IV-6) | — |
| | Amide compound having formula (I-2) | | — |
| | Alkylalkanediol | 2-ethyl-1,3-hexanediol | — |
| | | 2-methyl-1,3-butanediol | — |
| | | 3-methyl-1,3-butanediol | — |
| | | 3-methyl-1,5-pentanediol | — |
| | Polyol | Propylene glycol | — |
| | | Glycerin | 10.00 |
| | | 1,3-butanediol | 10.00 |
| Penetrant | 2-ethyl-1,3-hexanediol | | 2.00 |
| | 2,2,4-trimethyl-1,3-pentanediol | | — |
| Surfactant | KF-643 | | — |
| | ZONYL FS-300 | | 2.50 |
| | SOFTANOL EP-7025 | | — |
| Mildew proofing agent | Proxel GXL | | 0.05 |
| Defoaming agent | Silicone defoaming agent KM-72F | | 0.10 |
| pH adjuster | 2-amino-2-ethyl-1.3-propanediol | | 0.3 |
| Pure water | | | Balance |
| Total '(% by weight) | | | 100 |

TABLE 1-2

| Ink 2 | Ink 3 | Ink 4 | Ink 5 | Ink 6 | Ink 7 | Ink 8 | Ink 9 | Ink 10 |
|---|---|---|---|---|---|---|---|---|
| — | — | — | — | — | — | — | — | — |
| — | — | — | — | — | — | — | — | — |
| — | — | — | 33.33 | 33.33 | 33.33 | 33.33 | — | — |
| — | — | — | — | — | — | — | 33.33 | 33.33 |
| 50.00 | 50.00 | 50.00 | — | — | — | — | — | — |
| — | — | — | — | — | — | — | — | — |
| — | — | — | — | — | — | — | — | — |
| — | — | — | — | — | — | — | — | — |
| — | — | — | — | — | — | — | — | — |
| — | — | — | — | — | — | — | — | — |
| 10.00 | 10.00 | 10.00 | 10.00 | 10.00 | 10.00 | 10.00 | 20.00 | 30.00 |
| — | 10.00 | — | — | — | — | — | — | — |
| 10.00 | — | — | 10.00 | 10.00 | 10.00 | 10.00 | — | — |
| — | — | 10.00 | — | — | — | — | 10.00 | 5.00 |
| 5.00 | 10.00 | 10.00 | — | — | 5.00 | 5.00 | 5.00 | 5.00 |
| — | — | — | — | — | — | — | — | — |
| — | — | — | — | — | — | 15.00 | — | — |
| — | — | — | — | — | — | — | — | — |
| — | — | — | — | — | — | — | — | — |

TABLE 1-2-continued

| Ink 2 | Ink 3 | Ink 4 | Ink 5 | Ink 6 | Ink 7 | Ink 8 | Ink 9 | Ink 10 |
|---|---|---|---|---|---|---|---|---|
| 10.00 | 15.00 | 15.00 | 10.00 | 10.00 | 10.00 | 10.00 | 10.00 | 10.00 |
| 10.00 | — | — | 15.00 | 15.00 | 15.00 | — | 15.00 | — |
| 2.00 | 2.00 | 2.00 | — | — | 2.00 | 2.00 | — | 1.00 |
| — | — | — | — | 2.00 | — | — | 2.00 | 1.00 |
| — | — | — | — | — | — | — | — | — |
| 2.50 | 2.50 | 2.50 | 1.25 | 1.25 | 1.25 | 1.25 | 1.25 | 1.25 |
| — | — | — | — | — | — | — | — | — |
| 0.05 | 0.05 | 0.05 | 0.05 | 0.05 | 0.05 | 0.05 | 0.05 | 0.05 |
| 0.10 | 0.10 | 0.10 | 0.10 | 0.10 | 0.10 | 0.10 | 0.10 | 0.10 |
| 0.3 | 0.3 | 0.3 | 0.3 | 0.3 | 0.3 | 0.3 | 0.3 | 0.3 |
| Balance | Balance | Balance | Balance | Balance | Balance | Balance | Balance | Balance |
| 100 | 100 | 100 | 100 | 100 | 100 | 100 | 100 | 100 |

TABLE 1-3

| Ink 11 | Ink 12 | Ink 13 | Ink 14 | Ink 15 | Ink 16 | Ink 17 | Ink 18 | Ink 19 |
|---|---|---|---|---|---|---|---|---|
| — | 30.00 | — | — | — | — | — | 25.00 | 25.00 |
| 53.33 | — | — | — | — | — | — | — | — |
| — | — | — | — | — | — | — | — | — |
| — | — | — | — | — | — | — | — | — |
| — | — | — | — | — | 50.00 | — | — | — |
| — | — | 13.90 | — | — | — | — | — | — |
| — | — | — | 28.57 | — | — | — | — | — |
| — | — | — | — | 14.67 | — | 14.67 | — | — |
| — | — | 5.38 | 5.38 | 5.38 | — | — | 5.38 | 5.38 |
| — | — | — | — | — | — | 4.44 | — | — |
| 10.00 | 12.50 | 15.00 | 7.50 | 7.50 | 3.00 | 10.00 | 11.50 | 10.00 |
| 7.50 | — | 10.00 | — | — | 5.00 | 3.00 | 10.00 | 10.00 |
| — | 10.00 | — | 10.00 | 10.00 | — | — | — | — |
| 6.00 | 7.50 | 10.00 | 5.00 | 5.00 | 5.00 | 50.00 | 8.50 | 11.50 |
| 10.00 | — | — | — | — | — | — | — | — |
| — | 15.00 | — | — | — | 10.00 | — | — | — |
| — | — | — | — | — | — | — | — | — |
| — | — | 20.00 | — | — | — | — | — | — |
| 10.0 | 10.0 | 10.0 | 10.00 | 10.00 | 15.0 | 10.00 | 8.00 | 12.0 |
| — | — | — | 14.00 | 17.00 | — | — | — | — |
| 2.00 | 2.00 | 2.00 | 2.00 | 2.00 | 2.00 | — | 2.0 | 1.00 |
| — | — | — | — | — | — | 2.0 | — | — |
| 1.00 | 1.00 | 1.00 | 1.00 | 1.00 | — | — | — | — |
| — | — | — | — | — | 2.50 | — | 1.25 | 1.25 |
| — | — | — | — | — | — | 0.50 | — | — |
| 0.05 | 0.05 | 0.05 | 0.05 | 0.05 | 0.05 | 0.05 | 0.05 | 0.05 |
| 0.10 | 0.10 | 0.10 | 0.10 | 0.10 | 0.10 | 0.10 | 0.10 | 0.10 |
| 0.3 | 0.3 | 0.3 | 0.3 | 0.3 | 0.3 | 0.3 | 0.3 | 0.3 |
| Balance | Balance | Balance | Balance | Balance | Balance | Balance | Balance | Balance |
| 100 | 100 | 100 | 100 | 100 | 100 | 100 | 100 | 100 |

TABLE 1-4

| Ink 20 | Ink 21 | Ink 22 | Ink 23 | Ink 24 | Ink 25 | Ink 26 | Ink 27 | Ink 28 |
|---|---|---|---|---|---|---|---|---|
| 18.67 | — | — | — | 26.67 | 30.00 | — | — | — |
| — | — | 5.00 | — | — | — | — | — | — |
| — | 3.00 | — | — | — | — | — | — | — |
| 16.00 | — | — | 50.00 | — | — | 55.33 | 50.00 | 50.00 |
| — | — | 24.11 | — | — | — | — | — | — |
| — | 14.89 | — | — | — | — | — | — | — |
| 2.69 | — | — | — | — | — | — | — | — |
| 8.50 | 11.50 | 8.50 | — | — | — | — | 10.00 | — |
| — | — | — | — | — | — | — | — | 10.00 |
| 10.00 | 12.50 | 10.00 | — | — | — | — | — | — |
| — | — | — | — | — | — | — | — | — |

TABLE 1-4-continued

| Ink 20 | Ink 21 | Ink 22 | Ink 23 | Ink 24 | Ink 25 | Ink 26 | Ink 27 | Ink 28 |
|---|---|---|---|---|---|---|---|---|
| 11.50 | 10.00 | 10.00 | — | 10.00 | — | — | — | — |
| — | — | — | — | 7.50 | 7.50 | 27.50 | — | — |
| — | — | — | — | — | — | — | — | — |
| — | — | — | — | — | — | 5.00 | — | — |
| 10.00 | 10.00 | 10.00 | 17.50 | 20.00 | 30.00 | — | 20.00 | 20.00 |
| — | — | — | 17.50 | 7.5 | 15.00 | 10.00 | 17.50 | 17.50 |
| 2.0 | 1.00 | 1.00 | 2.00 | 2.00 | 1.00 | — | 2.00 | 2.00 |
| — | — | — | — | — | — | — | — | — |
| — | — | — | — | — | — | 1.00 | — | — |
| 1.25 | 1.25 | 1.25 | 2.50 | 2.50 | 1.25 | — | 2.50 | 2.50 |
| — | — | — | — | — | — | — | — | — |
| 0.05 | 0.05 | 0.05 | 0.05 | 0.05 | 0.05 | 0.05 | 0.05 | 0.05 |
| 0.10 | 0.10 | 0.10 | 0.10 | 0.10 | 0.10 | 0.10 | 0.10 | 0.10 |
| 0.3 | 0.3 | 0.3 | 0.3 | 0.3 | 0.3 | 0.3 | 0.3 | 0.3 |
| Balance | Balance | Balance | Balance | Balance | Balance | Balance | Balance | Balance |
| 100 | 100 | 100 | 100 | 100 | 100 | 100 | 100 | 100 |

TABLE 1-5

| Ink 29 | Ink 30 | Ink 31 |
|---|---|---|
| — | — | — |
| — | — | — |
| — | — | — |
| 50.00 | 50.00 | 50.00 |
| — | — | — |
| — | — | — |
| — | — | — |
| — | — | — |
| — | — | — |
| 10.00 | — | — |
| — | 10.00 | — |
| — | — | — |
| — | — | — |
| — | — | 22.00 |
| — | — | — |
| 20.00 | 20.00 | 22.00 |
| 17.50 | 17.50 | — |
| 2.00 | 2.00 | 2.00– |
| — | — | — |
| 2.50 | 2.50 | 2.50 |
| — | — | — |
| 0.05 | 0.05 | 0.05 |
| 0.10 | 0.10 | 0.10 |
| 0.3 | 0.3 | 0.3 |
| Balance | Balance | Balance |
| 100 | 100 | 100 |

Acryl-silicone resin emulsion: POLYSOL ROY6312 from SHOWA HIGHPOLYMER CO., LTD, having a solid content of 37.2% by weight, a volume average particle diameter of 171 nm and a minimum film forming temperature (MFT) of 20° C.

Polyurethane emulsion: HYDRAN APX-101H from DIC Corporation, having a solid content of 45%, a volume average particle diameter of 148 nm and a minimum film forming temperature (MFT) of 20° C.

KF-643: polyether-modified silicone compound from Shin-Etsu Chemical Co., Ltd., having a component of 100% by weight.

ZONYL FS-300: polyoxyethylene perfluoroalkyl ether from E.I.du Pont de Nemours & Company, having a component of 40% by weight.

SOFTANOL EP-7025: polyoxyalkylene alkyl ether from Nippon Shokubai Co., Ltd., having a component of 100% by weight.

Proxel GXL: Mildew proofing agent containing 1,2-benzisothiazolin-3-one as a main component from Avecia Inc., having a component of 20% by weight, including dipropylene glycol.

KM-72F: a self-emulsifiable silicone defoaming agent from Shin-Etsu Chemical Co., Ltd., having a component of 100% by weight.

Next, each of the prepared inks 1 to 31 of Production Examples 1 to 31 was evaluated in terms of their physical properties in accordance with the following evaluation methods. The results are shown in Table 2.

<Viscosity>

The viscosity of the ink was measured at 25° C. by means of a viscometer RE-80L from TOKI SANGYO CO., LTD.

<pH>

The pH of the ink was measured at 25° C. by means of a pH meter HM-30R from TOA-DKK CORPORATION.

<Static Surface Tension>

The static surface tension of the ink was measured at 25° C. by means of an automatic surface tensiometer CBVP-Z from Kyowa Interface Science Co., Ltd.

TABLE 2

| | Initial Properties | | |
|---|---|---|---|
| | Viscosity (mPa · s) | pH | Static Surface Tension (mN/m) |
| Ink 1 | 16.5 | 9.5 | 24.6 |
| Ink 2 | 13.6 | 9.3 | 24.2 |
| Ink 3 | 13.8 | 9.6 | 24.1 |
| Ink 4 | 17.5 | 9.7 | 26.5 |
| Ink 5 | 17.2 | 9.4 | 25.7 |
| Ink 6 | 17.8 | 9.4 | 25.2 |
| Ink 7 | 15.6 | 9.7 | 24.7 |
| Ink 8 | 17.2 | 9.6 | 24.8 |
| Ink 9 | 18.7 | 9.8 | 27.6 |
| Ink 10 | 15.9 | 9.7 | 26.4 |
| Ink 11 | 18.3 | 9.5 | 22.8 |
| Ink 12 | 19.0 | 9.4 | 22.4 |
| Ink 13 | 19.5 | 9.7 | 23.1 |
| Ink 14 | 15.9 | 9.7 | 23.7 |
| Ink 15 | 16.2 | 9.7 | 23.8 |
| Ink 16 | 8.8 | 9.4 | 23.6 |
| Ink 17 | 18.1 | 9.7 | 32.2 |
| Ink 18 | 7.7 | 9.7 | 24.7 |
| Ink 19 | 8.2 | 9.6 | 24.9 |
| Ink 20 | 8.1 | 9.5 | 25.4 |

TABLE 2-continued

| | Initial Properties | | |
|---|---|---|---|
| | Viscosity (mPa·s) | pH | Static Surface Tension (mN/m) |
| Ink 21 | 9.5 | 9.4 | 24.5 |
| Ink 22 | 7.5 | 9.4 | 24.6 |
| Ink 23 | 8.4 | 9.1 | 25.4 |
| Ink 24 | 10.9 | 9.3 | 25.7 |
| Ink 25 | 20.5 | 9.2 | 26.8 |
| Ink 26 | 26.7 | 9.3 | 22.9 |
| Ink 27 | 13.5 | 9.5 | 25.2 |
| Ink 28 | 15.9 | 9.6 | 25.3 |
| Ink 29 | 16.2 | 9.4 | 25.2 |

TABLE 2-continued

| | Initial Properties | | |
|---|---|---|---|
| | Viscosity (mPa·s) | pH | Static Surface Tension (mN/m) |
| Ink 30 | 17.0 | 9.3 | 25.5 |
| Ink 31 | 15.1 | 9.8 | 25.4 |

<Preparation of Pretreatment Liquid>

Pretreatment Liquid Preparation Examples 1 to 9

Each of pretreatment liquids was prepared in the manner described below.

At first, respective materials shown in Tables 3-1 and 3-2 were stirred for 1 hr, to thereby obtain a uniform mixture. The resulting mixture was then subjected to pressure filtration using a polyvinylidene fluoride membrane filter having an average pore diameter of 5.0 μm to remove foreign particles such as insoluble matters, to thereby prepare each pre-treatment liquid of Preparation Examples 1 to 9.

TABLE 3

| Component (% by weight) | | 1 | 2 | 3 | 4 | 5 | 6 | 7 | 8 | 9 |
|---|---|---|---|---|---|---|---|---|---|---|
| Hydrosoluble aliphatic organic acid | L-lactic acid (Carboxyl group: 1) | 5.00 | — | — | 15.00 | — | — | — | — | 11.76 |
| | L(+)-tartaric acid (Carboxyl group: 2) | — | 10.00 | — | — | 20.00 | — | — | — | — |
| | DL-malic acid (Carboxyl group: 2) | — | — | 15.00 | — | — | 10.0 | — | — | — |
| Hydrosoluble organic monoamine compound | 3-amino-1-propanol | — | 10.01 | — | — | 20.02 | — | — | — | — |
| | 2-amino-2-ethyl-1,3-propanediol | 6.61 | — | 26.66 | — | — | 17.77 | — | — | — |
| | N,N-diethylethanolamine | — | — | — | 23.42 | — | — | — | — | — |
| Inorganic metal salt compound | Magnesium sulfate | — | — | — | — | — | — | — | 10.00 | — |
| | Calcium nitrate | — | — | — | — | — | — | 10.00 | — | — |
| Wetter | 3-methyl-1,3-butanediol | — | 10.00 | 15.00 | — | 5.00 | 5.00 | 10.00 | 20.00 | 10.00 |
| | Glycerin | 15.00 | 15.00 | 10.00 | — | 20.00 | 10.00 | 15.00 | 10.00 | 20.00 |
| Penetrant | 2-ethyl-1,3-hexanediol | 2.0 | 1.00 | 1.00 | — | — | 1.00 | 1.00 | — | 2.00 |
| Surfactant | ZONYL FS-300 | — | — | 2.50 | — | — | 2.50 | — | — | — |
| | FUTARGENT 251 | — | 1.00 | — | — | 1.00 | — | 1.00 | — | 0.50 |
| | KF-643 | — | — | — | 1.00 | — | — | — | — | — |
| Mildew proofing agent | Proxel GXL | 0.05 | 0.05 | 0.05 | 0.05 | 0.05 | 0.05 | 0.05 | 0.05 | 0.05 |
| Anti-rust agent | 1,2,3-benzotriazol | 0.10 | 0.10 | 0.10 | 0.10 | 0.10 | 0.10 | 0.10 | 0.10 | 0.10 |
| Pure water | | Balance | Balance | Balance | Balance | Balance | Balance | Balance | Balance | Balance |
| Total '(% by weight) | | 100 | 100 | 100 | 100 | 100 | 100 | 100 | 100 | 100 |

L-lactic acid: from TOKYO CHEMICAL INDUSTRY CO., LTD., having a purity of 85% or higher and 3 carbon atoms.

L(+)-tartaric acid: from KANTO CHEMICAL CO., INC., having a purity of 99.5% or higher and 4 carbon atoms.

FUTARGENT 251: Branched perfluoroalkenyl group-containing fluorosurfactant from NEOS COMPANY LIMITED and having an effective component of 100% by weight.

Each of the prepared pretreatment agents of Preparation Examples 1 to 9 was evaluated in terms of their physical properties in accordance with the following evaluation methods. The ratio of the organic amine to the organic acid was calculated using the following formula. The results are shown in Table 4.

<pH>

The pH of the ink was measured at 25° C. by means of a pH meter HM-30R from TOA-DKK CORPORATION.

<Static Surface Tension>

The static surface tension of the ink was measured at 25° C. by means of an automatic surface tensiometer CBVP-Z from Kyowa Interface Science Co., Ltd.

$$\text{Ratio of organic amine to organic acid} = \frac{\text{The number of moles of water-soluble organic monoamine compound}}{\text{The number of moles of water-soluble aliphatic organic acid} \times \text{The number of acid groups contained per molecule of water-soluble aliphatic organic acid}}$$

TABLE 4

|  | Ratio of organic amine to organic acid | pH | Static surface tension (mN/m) |
|---|---|---|---|
| Preparation Example 1 | 1.18 | 8.11 | 52.6 |
| Preparation Example 2 | 1.0 | 7.41 | 22.8 |
| Preparation Example 3 | 1.0 | 7.55 | 22.4 |
| Preparation Example 4 | 1.4 | 8.72 | 21.6 |
| Preparation Example 5 | 1.0 | 7.69 | 23.5 |
| Preparation Example 6 | 1.0 | 7.83 | 24.3 |
| Preparation Example 7 | — | 3.01 | 21.6 |
| Preparation Example 8 | — | 7.04 | 55.2 |
| Preparation Example 9 | 0.0 | 1.80 | 22.2 |

Pretreatment Liquid Preparation Examples 10 to 20

The procedures for preparations of the pretreatment liquids in Pretreatment Liquid Preparation Examples 1 to 9 were repeated to prepare pretreatment liquids of Pretreatment Liquid Preparation Examples 10 to 20 except for changing the materials into those shown in Tables 5-1 and 5-2 described later. The hydrorsoluble cationic polymers A-1 to A-5 were prepared as follows.

<Preparation of Cationic Polymer>

Preparation Example A-1

Copolymer of N,N-dimethylallylamine Hydrochloride and N-Methyldiallylamine Hydrochloride (Charged Molar Ratio: 0.7:0.3)

Into a 1 L-separable flask reaction vessel equipped with a stirrer, a thermometer and a reflux condenser, a 71.66% by weight N,N-dimethylallylamine hydrochloride aqueous solution (237.58 g (1.4 mol)) and a 60.17% by weight N-methyldiallylamine hydrochloride aqueous solution (147.23 g (0.6 mol)) were added to obtain an aqueous solution of having a monomer concentration of 67.27% by weight. This aqueous solution was heated to 60°. After the temperature of the aqueous solution was constant, ammonium persulfate (4.56 g (1.0 mol % relative to monomer)) was added as a radical polymerization initiator to the aqueous solution to initiate polymerization. Also, 2 hours later, and 4 hours later of the initiation of polymerization, ammonium persulfate (4.56 g (1.0 mol % relative to monomer)) was added to the reaction system for each time. Furthermore, 23 hours later, 24 hours later, 25 hours later, 26 hours later, 27 hours later and 28 hours later of the initiation of polymerization, ammonium persulfate (9.13 g (2.0 mol % relative to monomer)) was added to the reaction system for each time. Thereafter, the polymerization reaction was further continued for 3 hours to thereby obtain a brown solution (Production Example A-1) of a copolymer of N,N-dimethylallylamine hydrochloride and N-methyldiallylamine hydrochloride (charged molar ratio: 0.7:0.3). A weight average molecular weight of the copolymer determined by GPC (Gel Permeation Chromatography) was 1,800.

Preparation Example A-2

Copolymer of N,N-dimethylallylamine Hydrochloride and N-Methyldiallylamine Hydrochloride (Charged Molar Ratio: 0.9:0.1)

Into a reaction vessel (the same type as used in Production Example A-1), a 61.54% by weight N,N-dimethylallylamine hydrochloride aqueous solution (533.56 g (2.7 mol)) and a 60.17% by weight N-methyldiallylamine hydrochloride aqueous solution (73.62 g (0.3 mol)) were added to obtain an aqueous solution of having a monomer concentration of 61.37% by weight. This aqueous solution was heated to 60°. After the temperature of the aqueous solution was constant, ammonium persulfate (6.85 g (1.0 mol % relative to monomer)) was added as a radical polymerization initiator to the aqueous solution to initiate polymerization. Also, 2 hours later, and 4 hours later of the initiation of polymerization, ammonium persulfate (6.85 g (1.0 mol % relative to monomer)) was added to the reaction system for each time. Furthermore, 23 hours later, 24 hours later, 25 hours later, 26 hours later, 27 hours later, 47 hours later and 48 hours later of the initiation of polymerization, ammonium persulfate (13.69 g (2.0 mol % relative to monomer)) was added to the reaction system for each time. Thereafter, the polymerization reaction was further continued for 2 hours to thereby obtain a brown solution (Production Example A-2) of a copolymer of N,N-dimethylallylamine hydrochloride and N-methyldiallylamine hydrochloride (charged molar ratio: 0.9:0.1). A weight average molecular weight of the copolymer determined by GPC (Gel Permeation Chromatography) was 700.

Preparation Example A-3

Copolymer of Monoallylamine Hydrochloride and N,N-dimethylallylamine Hydrochloride (Charged Molar Ratio: 0.5:0.5)

Into a 300 ml-three-necked flask equipped with a stirrer, a thermometer, and a reflux condenser, a 72.11% by weight monoallylamine hydrochloride aqueous solution (64.87 g (0.50 mol)) and a 60.21% by weight N,N-dimethylallylamine hydrochloride aqueous solution (100.99 g (0.50 mol) were charged, and water (13.45 g) was added to obtain an aqueous solution having a monomer concentration of 60% by weight. This aqueous solution was heated to 6° C.°. After the temperature of the aqueous solution was constant, 2,2-azobis(2-amidinopropane)dihydrochloride (8.68 g (3.2 mol % relative to monomer)) was added as a radical polymerization initiator to the aqueous solution to initiate polymerization. Also, 24 hours later, 48 hours later and 72 hours later of the initiation of polymerization, 2,2-azobis(2-amidinopropane)dihydrochloride (8.68 g) was added to the reaction system for each time. Thereafter, the polymerization reaction was further continued for 24 hours to obtain a light yellow reaction solution. Thereafter, the resulting light yellow reaction solution was poured into 3 litters of acetone-isopropanol mixture solvent (weight ratio: 1:1) to reprecipitate the copolymer, filtered through a glass filter, and then sufficiently washed, followed by vacuum drying at 60° C. for 48 hours to thereby obtain a brown solution (Production Example A-3) of a copolymer of monoallylamine hydrochloride and N,N-dimethylallylamine hydrochloride (charged molar ratio: 0.5:0.5). A weight average molecular weight of the copolymer determined by GPC (Gel Permeation Chromatography) was 800.

Preparation Example A-4

Diallyldimethylamine Hydrochloride-Sulfur Dioxide Copolymer

Into a 300 ml-four-necked flask equipped with a stirrer, a thermometer, and a reflux condenser, a 1 mol/L diallyldimethylamine hydrochloride/diemthylsulfoxide (100 ml) and a 1 mol/L sulfur dioxide/diemthylsulfoxide solution (100 ml) were added and mixed, and azobis-isobutylonitrile (0.82 g) was added as a polymerization initiator to the mixture, followed by polymerizing at 40° C. for 24 hours. The reaction solution was added dropwise to methanol to precipitate the copolymer, filtered through a glass filter, followed by drying under reduced pressure, thereby obtaining 18 g of a copolymerized polymer (Production Example A-4). A weight average molecular weight of the copolymer determined by GPC (Gel Permeation Chromatography) (polyethylene glycol used as a standard) was about 3,000. The repeating unit of this polymer gas the following formula.

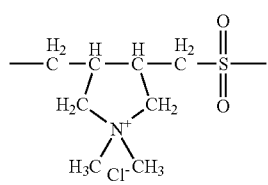

Preparation Example A-5

Diallyldimethyl Ammonium Chloride-Acrylamide Copolymer

Into a 500 ml-four-necked flask equipped with a stirrer, a thermometer, and a reflux condenser, a 60% by weight diallyldimethyl ammonium chloride aqueous solution (134.7 g (0.5 mol)) and distilled water (176 g) were charged, and the pH of the mixture was adjusted with chloride to 3 to 4. Next, acrylamine (18.3 g (0.25 mol) and sodium hypophosphite (3.9 g) were added thereto, and stirred at 50° C. to be dissolved. Next, the internal temperature of the system was increased to 60° C., and a 28.5% by weight ammonium persulfate aqueous solution (1.7 g) was added thereto. Four hours later, the ammonium persulfate aqueous solution (3.5 g) was further added while the internal temperature of the system being maintained at 60° C. to 65° C. Thereafter, the reaction system was reacted at 60° C. for 20 hours to thereby obtain a diallyldimethyl ammonium chloride-acrylamide copolymer (Production Example A-5). A weight average molecular weight of the copolymer was determined by GPC (Gel Permeation Chromatography) and found to be 3,000.

TABLE 5-1

| | Component (% by weight) | 10 | 11 |
|---|---|---|---|
| Organic acid ammonium | Ammonium lactate (content: 75%) | — | — |
| | Ammonium acetate (content: 97%) | — | — |
| Hydrosoluble Cationic polymer | A-1 | 20.00 | — |
| | A-2 | — | — |
| | A-3 | — | 40.00 |
| | A-4 | — | — |
| | A-5 | — | — |
| | WS-4020 | — | — |
| | SHAROL DM-283P | — | — |
| Wetter | 3-methyl-1,3-butanediol | 10.00 | 10.00 |
| | glycerin | 20.00 | 20.00 |
| Penetrant | 2-ethyl-1,3-hexanediol | 1.00 | 1.00 |
| Defoaming agent | 2,4,7,9-tetramethyldecane-4,7-diol | 0.10 | 0.10 |
| | 2,5,8,11-tetramethyldodecane-5,8-diol | — | — |
| | KM-72F | — | — |
| Fluoro-chemical surfactant | Compound having formula (F-1)-e | 0.20 | — |
| | Compound having formula (F-2) | — | 0.20 |
| | Compound having formula (F-3-1) | — | — |
| | Compound having formula (F-4-1) | — | — |
| Surfactant | SOFTANOL EP-7025 | — | — |
| Mildew proofing agent | PROXEL GXL | 0.05 | 0.05 |
| Anti-rust agent | 1,2,3-benzotriazole | 0.05 | 0.05 |
| Pure water | | Balance | Balance |
| Total (% by weight) | | 100 | 100 |

TABLE 5-2

| 12 | 13 | 14 | 15 | 16 | 17 | 18 | 19 | 20 |
|---|---|---|---|---|---|---|---|---|
| — | 6.67 | 6.67 | — | 6.67 | 6.67 | — | — | — |
| — | — | — | 5.15 | — | — | 10.31 | — | — |
| — | 20.00 | 20.00 | — | — | — | — | 20.00 | — |
| — | — | — | 20.00 | 20.00 | — | — | — | — |
| — | — | — | — | — | — | — | — | — |
| — | — | — | — | — | 33.33 | — | — | — |
| — | — | — | — | — | — | 33.33 | — | — |
| 40.00 | — | — | 20.00 | — | — | — | — | — |
| — | — | — | — | — | — | — | — | 20.00 |
| 20.00 | 10.00 | 10.00 | 10.00 | 15.00 | 15.00 | 15.00 | 10.00 | 10.00 |
| 10.00 | 20.00 | 20.00 | 20.00 | 20.00 | 20.00 | 20.00 | 20.00 | 20.00 |
| 1.00 | 1.00 | 1.00 | 1.00 | 1.00 | 1.00 | 1.00 | 1.00 | 1.00 |
| 0.10 | 0.10 | 0.10 | — | 0.10 | 0.10 | 0.10 | 0.10 | 0.10 |
| 0.10 | — | — | 0.10 | — | — | — | — | — |
| — | — | — | — | — | — | — | — | — |
| — | 0.20 | — | — | 0.20 | 0.20 | 0.20 | — | 0.20 |
| — | — | — | 0.30 | — | — | — | — | — |
| 0.10 | — | — | — | — | — | — | — | — |
| — | — | 0.10 | — | — | — | — | — | — |
| — | — | — | — | — | — | — | — | — |
| 0.05 | 0.05 | 0.05 | 0.05 | 0.05 | 0.05 | 0.05 | 0.05 | 0.05 |
| 0.05 | 0.05 | 0.05 | 0.05 | 0.05 | 0.05 | 0.05 | 0.05 | 0.05 |
| Balance | Balance | Balance | Balance | Balance | Balance | Balance | Balance | Balance |
| 100 | 100 | 100 | 100 | 100 | 100 | 100 | 100 | 100 |

Ammonium lactate: from Kanto Chemical Co., Inc., having a purity of from 73 to 77%.

Ammonium acetate: from Kanto Chemical Co., Inc., having a purity of 97% or more.

WS-4020: polyamide-epichlorohydrin copolymer from SEIKO PMC CORPORATION, having an effective component of 25% by weight.

SHAROLL DM-283P: quaternary ammonium salt type cationic polymer compound from DAI-ICHI KOGYO SEIYAKU CO., LTD., an aqueous solution containing 50% by weight of effective component, having a molecular weight about 28,000 and the following formula.

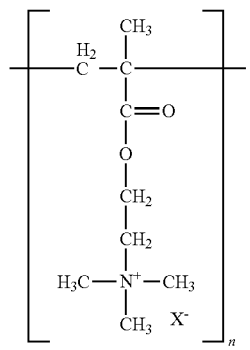

X represents a halogen atom and n represents an integer.

KM-72F: a self-emulsifiable silicone defoaming agent, manufactured by Shin-Etsu Chemical Co., Ltd., a component of 100% by weight.

Compound having formula (F-1)-e: $C_4F_9$—$CH_2CH(OH)CH_2$—$(CH_2CH_2O)_{25}$—$C_{12}H_{25}$ Compound having formula (F-2): $CF_3CF_2(CF_2CF_2)_j$—$CH_2CH_2O$—$(CH_2CH_2O)_kH$ wherein j represents 0 or an integer of from 1 to 10 and k represents 0 or an integer of from 1 to 40.

Compound having formula (F-3-1):

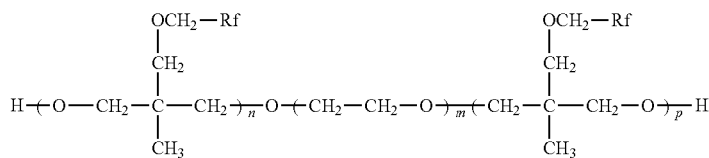

wherein Rf represents —$CF_3$ or —$CF_2CF_3$, n represents an integer of from 1 to 4, m represents an integer of from 6 to 25 and p represents an integer of from 1 to 4.

Compound having formula (F-3-1):

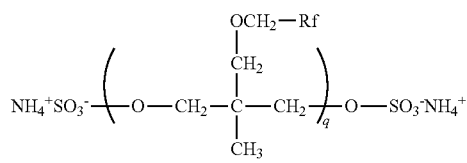

wherein Rf represents —$CF_3$ or —$CF_2CF_3$ and q represents an integer of from 1 to 6.

The pH and the static surface tension of the pretreatment agents 10 to 20 were measures as the pretreatment agents 1 to 9 were. The results are show in Table 6.

TABLE 6

| | pH | Static surface tension (mN/m) |
|---|---|---|
| Preparation Example 10 | 6.44 | 20.6 |
| Preparation Example 11 | 5.78 | 20.8 |
| Preparation Example 12 | 5.19 | 25.7 |
| Preparation Example 13 | 6.43 | 20.7 |
| Preparation Example 14 | 6.45 | 26.2. |
| Preparation Example 15 | 6.96 | 20.9 |
| Preparation Example 16 | 6.24 | 21.4 |
| Preparation Example 17 | 5.98 | 20.5 |
| Preparation Example 18 | 6.28 | 20.7 |
| Preparation Example 19 | 6.17 | 30.9 |
| Preparation Example 20 | 4.89 | 20.9 |

<Image Formation>

—Pretreatment Process—

Each of the pretreatment liquids of Preparation Examples 1 to 20 was coated on PPC My Paper from Ricoh company, Ltd. as a recoding medium in an adherence amount shown in Table 7 by a roll coating method, and then naturally dried. The pretreatment liquids were not coated in Comparative Examples 1 to 10.

My Paper was measured as recording papers (1) to (5) mentioned later were. The pure water was transferred thereto in an mount of 12.2 mL/m² at a contact time o 100 ms when measured by a dynamic scanning liquid absorptometer.

—Image Forming Process

In an adjusted environment where the temperature was 23±0.5° C. and the relative humidity was 50±5%, in an inkjet printer IPSIO GXe-5500 from Ricoh Company, Ltd., the drive voltage of a piezo element was changed so as to uniformly eject an ink and to make the ink adhere in the same amount to a recording medium. Next, the print mode of the inkjet printer was set to the "Plain Paper-Fast" to form an image.

TABLE 7

| | Pretreatment Process | | Image forming process |
|---|---|---|---|
| | Pretreatment liquid | Wet adherence amount | Ink |
| Example 1 | Preparation Example 1 | 1.6 g/m² | Production Example 1 |
| Example 2 | Preparation Example 2 | 1.6 g/m² | Production Example 2 |
| Example 3 | Preparation Example 3 | 0.8 g/m² | Production Example 3 |
| Example 4 | Preparation Example 4 | 0.8 g/m² | Production Example 4 |
| Example 5 | Preparation Example 5 | 0.8 g/m² | Production Example 5 |
| Example 6 | Preparation Example 6 | 0.8 g/m² | Production Example 6 |
| Example 7 | Preparation Example 10 | 1.6 g/m² | Production Example 7 |
| Example 8 | Preparation Example 11 | 1.6 g/m² | Production Example 8 |
| Example 9 | Preparation Example 12 | 1.6 g/m² | Production Example 9 |
| Example 10 | Preparation Example 13 | 0.8 g/m² | Production Example 10 |
| Example 11 | Preparation Example 14 | 0.8 g/m² | Production Example 11 |
| Example 12 | Preparation Example 15 | 0.8 g/m² | Production Example 12 |
| Example 13 | Preparation Example 16 | 0.8 g/m² | Production Example 13 |
| Example 14 | Preparation Example 17 | 0.8 g/m² | Production Example 14 |
| Example 15 | Preparation Example 18 | 0.8 g/m² | Production Example 15 |
| Example 16 | Preparation Example 13 | 0.8 g/m² | Production Example 16 |
| Example 17 | Preparation Example 13 | 0.8 g/m² | Production Example 17 |
| Example 18 | Preparation Example 13 | 0.8 g/m² | Production Example 18 |
| Example 19 | Preparation Example 13 | 0.8 g/m² | Production Example 19 |
| Example 20 | Preparation Example 13 | 0.8 g/m² | Production Example 20 |
| Example 21 | Preparation Example 13 | 0.8 g/m² | Production Example 21 |
| Example 22 | Preparation Example 13 | 0.8 g/m² | Production Example 22 |
| Example 23 | Preparation Example 7 | 0.8 g/m² | Production Example 18 |
| Example 24 | Preparation Example 8 | 0.8 g/m² | Production Example 18 |
| Example 25 | Preparation Example 9 | 0.8 g/m² | Production Example 18 |
| Example 26 | Preparation Example 19 | 0.8 g/m² | Production Example 18 |
| Example 27 | Preparation Example 20 | 0.8 g/m² | Production Example 18 |
| Comparative Example 1 | — | — | Production Example 23 |
| Comparative Example 2 | — | — | Production Example 24 |
| Comparative Example 3 | — | — | Production Example 25 |
| Comparative Example 4 | — | — | Production Example 26 |
| Comparative Example 5 | — | — | Production Example 27 |
| Comparative Example 6 | — | — | Production Example 28 |
| Comparative Example 7 | — | — | Production Example 29 |
| Comparative Example 8 | — | — | Production Example 30 |
| Comparative Example 9 | — | — | Production Example 31 |
| Comparative Example 10 | — | — | Production Example 15 |
| Comparative Example 11 | Preparation Example 13 | 1.6 g/m² | Production Example 23 |
| Comparative Example 12 | Preparation Example 13 | 1.6 g/m² | Production Example 24 |

Examples 1 to 27 and Comparative Examples 1 to 12 were evaluated as follows.

The results are shown in Table 8

<Image Density>

A chart, on which a symbol "■" (solid square image) of 64 point was formed using MICROSOFT WORD 2000 from Microsoft, was printed on a recording medium My Paper from Ricoh Company, Ltd., and the density of the image "■" on the printed surface was measured using X-Rite 939 from X-Rite. The results were evaluated, based on the following evaluation standard. As for the printing mode, "Plain paper-Standard Fast" mode was changed to "No Color Correction" mode by using a driver residing in a printer.

[Evaluation Standard]

Excellent: 1.3 or higher in Black, 0.85 or higher in Yellow, 1.1 or higher in Magenta, and 1.1 or higher in Cyan.

Good: 1.25 or higher but lower than 1.3 in Black, 0.8 or higher but lower than 0.85 in Yellow, 1.05 or higher but lower than 1.1 in Magenta, and 1.05 or higher but lower than 1.1 in Cyan.

Fair: 1.15 or higher but lower than 1.25 in Black, 0.7 or higher but lower than 0.8 in Yellow, 0.95 or higher but lower than 1.05 in Magenta, and 0.95 or higher but lower than 1.05 in Cyan.

Poor: lower than 1.15 in Black, lower than 0.7 in Yellow, lower than 0.95 in Magenta, and lower than 0.95 in Cyan.

<Color Saturation>

A chart formed in the same manner as the sample for the aforementioned test for image density, was printed on a recording medium My Paper from Ricoh Company, Ltd., and the density of the image "N" on the printed surface was measured using X-Rite 939 from X-Rite. As for the printing mode, "Plain Paper-Standard Fast" mode was changed to "No Color Correction" mode by using a driver residing in a printer.

Then, the obtained values for the saturation was calculated to obtain a ratio to the saturation values (Yellow: 91.34, Magenta: 74.55, Cyan: 62.82) of the standard color (Japan color ver. 2), and the results were evaluated based on the following evaluation standard.

[Evaluation Standard]

Yellow: Excellent: 0.9 or more; Good: 0.8 or more and less than 0.9; Poor: less than 0.8

Magenta: Excellent: 0.8 or more; Good: 0.75 or more and less than 0.8; Poor: less than 0.75

Cyan: Excellent: 0.85 or more; Good: 0.8 or more and less than 0.85; Poor: less than 0.8

<Curl>

A solid image was produced using a trial line head printer in FIGURE under the following printing conditions, and a curl amount was measured and evaluated, based on the following evaluation standard.

(1) Evaluation printer: Trial line head printer (FIG.

(2) Evaluation media: My Paper (PPC) from Ricoh Company, Ltd.

(3) Printing conditions: recoding density→300×600 dpi, printed area→526. 3 cm$^2$/A4, discharged ink amount→5.6 g/m$^2$ (4) Evaluation environment: 23±0.5° C., 50±5% RH (5) Curl measurement: Curl heights just after a printed paper is printed (in 10 sec after discharged from the printer) and after left for one day were measured. The A4 size My paper was placed still on a flat desk with the curled surface up, and heights of four corners thereof were measured with a JIS__1 class scale and an average of the heights was determined. When the curl was so large that the paper was cylindrically curled, a diameter thereof was measured.

[Evaluation Standard]

Excellent: less than 10 mm

Good: 10 mm or more and less than 40 mm

Fair: 40 mm or more

Poor: Cylindrically curled

The trial line head printer in FIGURE is explained. FIGURE is a schematic view illustrating an inner configuration of the printer.

In an image recording apparatus A, a paper feed tray 1 includes a base 5, and a pressure plate 2 and a paper rotor 4 feeding a recording paper 3 installed thereon. The pressure plate 2 is rotatable around a rotational axis installed on the base 5, and biased by the pressure plate spring 6 to the paper rotor 4. An unillustrated separation pad formed of a material having large friction coefficient such as an artificial skin is formed on a part of the pressure plate 2, facing the paper rotor 4 to prevent double feed of the recording paper 3. In addition, an unillustrated release cam releasing contact between the pressure plate 2 and the paper rotor 4 is arranged.

The release cam pushes the pressure plate 2 down to a predetermined position before starting printing, and the contact between the pressure plate 2 and the paper rotor 4 is released.

When a drive force from a feed roller 7 is transmitted by a gear or the like to the paper rotor 4 and the release cam, the release cam leaves from the pressure plate 2 and the pressure plate 2 rises to contact the paper rotor 4 to the recoding paper 3. Then, with rotation of the paper rotor 4, the recording paper 2 is picked up and separated one by one by an unillustrated separation click. The paper rotor 4 rotates to feed the recording paper 3 to a platen 10 through a feed guides 8 and 9. The recoding paper 3 passes between the feed guides 8 and 9 and is fed to the feed roller 7, and to platen 10 thereby and a pinch roller 11. Then, contact between the recording paper 3 and the paper rotor 4 is released and the drive force from a feed roller 7 is shut.

A paper feed rotor 12 for manual paper feed feeds the recoding paper 3 on a manual tray 13 according to a recording order signal to the feed roller 7. The recording paper 3 fed to the platen 10 passes under a line head 14.

The feeding speed of the recording paper and a droplet discharge timing are adjusted, based on a signal controlled by an unillustrated electric circuit to form a desired image.

<Discharge Stability>

Two hundred (200) sheets of a chart of solid images having an area ratio of 5% per color made by Microsoft Word 2000 were continuously printed on My Paper A4 size from Ricoh Company, Ltd. and disturbance of ink discharging by each nozzle was evaluated after printing. As for the printing mode, "Plain Paper-Standard Fast" mode was changed to "No Color Correction" mode by using a driver residing in a printer.

[Evaluation Standard]

Good: No disturbance

Fair: Slight disturbance

Poor: Disturbed or not discharged partially

<Ink Storage Stability>

The viscosity of the ink before stored and after stored in a sealed container at 70° C. for 7 days using a viscometer RE-550L from TOKI SANGYO CO., LTD. The ink storage stability was evaluated under the following standard.

Ink Storage Stability(%)=[(viscosity after stored)/(Viscosity before stored)]×100

[Evaluation Standard]

Good: less than 100±10%

Fair: 100±10% or more and less than less than 100±20%

Poor: 100±20% or more

<Smear Fixability>

A chart, on which a symbol "■" (solid square image) of 64 point was formed using MICROSOFT WORD 2000 from Microsoft, was printed on a recording medium My Paper from Ricoh Company, Ltd. after pretreated as Table 7 shows. Then, after dried at 23±2° C. and 50±15% for 24 hrs, the monochrome solid image on the printing surface was rubbed back and forth 10 times with cotton No. 3 (conforming to JIS L0803 standard) attached to a CM-1 clock meter using a double-faced adhesive. The amount of transferred ink from the solid image to that cotton was measured using X-Rite 938. The original color of that cotton was eliminated for obtaining the density. Based on the measured amount, the density of the transferred ink on the cotton was obtained and evaluated based on the following evaluation standard.

[Evaluation Standard] • • • "Plain Paper-Fast" mode

Excellent: less than 0.01

Good: 0.01 or more and less than 0.025

Fair: 0.025 or more and less than 0.05 (Practically usable level)

Poor: 0.05 or more

TABLE 8

| | Image density | Color saturation | Curl Just after printed | Curl One day after printed | Discharge stability | Storage stability | Smear fixability |
|---|---|---|---|---|---|---|---|
| Example 1 | Excellent | — | Good | Excellent | Fair | Fair | Good |
| Example 2 | Good | — | Good | Excellent | Good | Good | Excellent |
| Example 3 | Good | — | Good | Excellent | Good | Fair | Excellent |
| Example 4 | Excellent | — | Good | Excellent | Good | Good | Excellent |
| Example 5 | Good | Good | Good | Excellent | Fair | Good | Excellent |
| Example 6 | Good | Excellent | Good | Excellent | Fair | Good | Excellent |
| Example 7 | Good | Excellent | Good | Excellent | Good | Good | Excellent |
| Example 8 | Good | Excellent | Excellent | Excellent | Good | Good | Excellent |
| Example 9 | Fair | Good | Good | Excellent | Good | Good | Excellent |
| Example 10 | Good | Excellent | Excellent | Excellent | Good | Good | Excellent |
| Example 11 | Good | Excellent | Excellent | Excellent | Good | Good | Excellent |
| Example 12 | Good | — | Excellent | Excellent | Good | Good | Fair |
| Example 13 | Good | Excellent | Excellent | Excellent | Good | Good | Excellent |
| Example 14 | Good | Excellent | Good | Excellent | Fair | Good | Excellent |
| Example 15 | Good | Good | Good | Excellent | Fair | Good | Excellent |
| Example 16 | Excellent | — | Fair | Good | Good | Good | Excellent |
| Example 17 | Good | Excellent | Fair | Excellent | Good | Good | Excellent |
| Example 18 | Excellent | — | Good | Excellent | Good | Good | Excellent |
| Example 19 | Excellent | — | Good | Excellent | Good | Good | Excellent |
| Example 20 | Excellent | — | Good | Excellent | Good | Good | Excellent |
| Example 21 | Good | Excellent | Good | Excellent | Good | Good | Excellent |
| Example 22 | Good | Excellent | Good | Excellent | Good | Good | Excellent |
| Example 23 | Excellent | — | Good | Excellent | Good | Good | Fair |
| Example 24 | Excellent | — | Fair | Excellent | Good | Good | Fair |
| Example 25 | Excellent | — | Good | Excellent | Good | Good | Good |
| Example 26 | Good | — | Good | Excellent | Good | Good | Excellent |
| Example 27 | Fair | — | Good | Excellent | Good | Good | Excellent |
| Comparative Example 1 | Good | — | Poor | Good | Good | Good | Good |
| Comparative Example 2 | Good | — | Poor | Good | Good | Good | Fair |
| Comparative Example 3 | Excellent | — | Poor | Good | Fair | Fair | Fair |
| Comparative Example 4 | Not evaluable | Not evaluable | Not evaluable | Not evaluable | Poor | Poor | Not evaluable |
| Comparative Example 5 | Good | — | Poor | Good | Good | Good | Excellent |
| Comparative Example 6 | Good | — | Poor | Good | Good | Good | Excellent |
| Comparative Example 7 | Good | — | Poor | Good | Good | Good | Excellent |
| Comparative Example 8 | Good | — | Poor | Good | Poor | Fair | Good |
| Comparative Example 9 | Fair | — | Good | Excellent | Good | Good | Excellent |
| Comparative Example 10 | Poor | Poor | Good | Excellent | Fair | Good | Excellent |
| Comparative Example 11 | Excellent | — | Poor | Good | Good | Good | Good |
| Comparative Example 12 | Excellent | — | Poor | Good | Good | Good | Poor |

* "—" means unmeasurable

Examples 28 to 30 and Comparative Examples 13 and 14

Recording Paper (1): Aurora Coat having a weight of 104.7 g/m² from Nippon Paper Industries Co., Ltd.

Recording Paper (2): POD Gloss Coat Paper having a weight of 100 g/m² from Oji Paper Co., Ltd.

Recording Paper (3): Space Dx (gravure paper) having a weight of 56.5 g/m² from Nippon Paper Industries Co., Ltd.

Recording Paper (4): Super Fine Paper (Mat coat paper for inkjet) from Seiko Epson Corp.

Recording Paper (5): Lumirror U10 from Toray Industries, Inc., having a thickness of 100 μm (transparent polyester film)

<Measurement of Transfer Amount of Pure Water by Dynamic Scanning Liquid Absorptometer>

The transfer amount of pure water to the surface having a coated layer of each of the recording papers (1) to (5) was measured. Namely, an absorption curve of the pure water was measured by a dynamic scanning liquid absorptometer (K350 Series D type from KYOWA CO., LTD.). A diagram of the transfer amount (mL/m²) and a square root (ms) was formed and the transfer amount after a specific time was determined by interpolation.

TABLE 9

| | | Transfer amount of pure water | |
|---|---|---|---|
| | | Contact time 100 ms | Contact time 400 ms |
| Example 28 | Recoding Paper (1) | 2.8 | 3.4 |
| Example 29 | Recoding Paper (2) | 3.1 | 3.5 |
| Example 30 | Recoding Paper (3) | 9.9 | 21.5 |
| Comparative Example 13 | Recoding Paper (4) | 41.0 | 44.8 |
| Comparative Example 14 | Recoding Paper (5) | 0.1 | 0.1 |

The pretreatment liquid of Preparation Example 13 was coated on the coated surface of each of the following recording media papers (1) to (5) by a roll coating method in an amount of 1.6 g/m$^2$ and naturally dried. Further, the ink of Production Example 18 was used to evaluate the image quality. The results are shown in Table 10.

<Image Density>

A chart, on which a symbol "■" (solid square image) of 64 point was formed using MICROSOFT WORD 2000 from Microsoft, was printed on the coated surface of each of the following recording media papers (1) to (5) after pretreated as Table 7 shows. Then, the density of the image "■" on the printed surface was measured using X-Rite 939 from X-Rite. The results were evaluated, based on the following evaluation standard. As for the printing mode, "Gloss Paper-Fine" mode was changed to "No Color Correction" mode using a driver residing in a printer.

[Evaluation Standard]

Excellent: 2.0 or higher in Black, 1.25 or higher in Yellow, 2.0 or higher in Magenta, and 2.0 or higher in Cyan.

Good: 1.9 or higher but lower than 2.0 in Black, 1.2 or higher but lower than 1.25 in Yellow, 1.9 or higher but lower than 2.0 in Magenta, and 1.9 or higher but lower than 2.0 in Cyan.

Fair: 1.8 or higher but lower than 1.9 in Black, 1.15 or higher but lower than 1.2 in Yellow, 1.8 or higher but lower than 1.9 in Magenta, and 1.8 or higher but lower than 1.9 in Cyan.

Poor: lower than 1.8 in Black, lower than 1.15 in Yellow, lower than 1.8 in Magenta, and lower than 1.8 in Cyan.

<Beading>

The degree of the beading on the black solid image part of each image was visually observed. The valuation was performed using a grade sample (rank: poor 1.0 to 5.0 good).

<Spur Mark>

The degree of the spur mark (offset contamination) from the black solid image part to the background of each image print was visually observed to evaluate by the following standard.

1.0: Clearly visible
2.0: Slightly visible
3.0: No contamination

<Cockling.

A chart, on which a symbol "■" (3 solid square images) of 3 cm×15 cm was formed using MICROSOFT WORD 2000 from Microsoft, was printed on the coated surface of each of the following recording media papers (1) to (5) after pretreated as Table 7 shows. The cockling was visually observed just after an image was printed with the ink and evaluated whether the printed paper was transferred without problem by the following evaluation standard.

As for the printing mode, "Gloss Paper-Fine" mode was changed to "No Color Correction" mode using a driver residing in a printer.

[Evaluation Standard]

Excellent: No cockling (No problem in transfer)
Good: Slight cockling (No problem in transfer)
Fair: Cockling (Problem in transfer)
Poor: Heavy cockling (Serious problem in transfer)

<Glossiness>

A chart, on which a symbol "■" (solid square image) of 64 point was formed using MICROSOFT WORD 2000 from Microsoft, was printed on the coated surface of each of the following recording media papers (1) to (5) after pretreated as Table 7 shows. Then, the 60° glossiness of the image "■" on the printed surface was measured using a gloss meter 4501 from BYK Gardener, Inc. The results were evaluated, based on the following evaluation standard. As for the printing mode, "Gloss Paper-Fine" mode was changed to "No Color Correction" mode using a driver residing in a printer.

[Evaluation Standard]

Excellent: 50 or more
Good: 30 or more and less than 50
Fair: 15 or more and less than 30
Poor: Less than 15

<Smear Fixability>

A chart, on which a symbol "■" (solid square image) of 64 point was formed using MICROSOFT WORD 2000 from Microsoft, was printed on the coated surface of each of the following recording media papers (1) to (5) after pretreated as Table 7 shows. Then, after dried at 23±2° C. and 50±15% for 24 hrs, the monochrome solid image on the printing surface was rubbed back and forth 10 times with cotton No. 3 (conforming to JIS L0803 standard) attached to a CM-1 clock meter using a double-faced adhesive. The amount of transferred ink from the solid image to that cotton was measured using X-Rite 938. The original color of that cotton was eliminated for obtaining the density. Based on the measured amount, the density of the transferred ink on the cotton was obtained and evaluated based on the following evaluation standard.

[Evaluation Standard] • • • "Gloss Paper-Fine" mode

Excellent: less than 0.05
Good: 0.05 or more and less than 0.1
Fair: 0.1 or more and less than 0.15 (Practically usable level)
Poor: 0.15 or more

TABLE 10

| | | Image density | Beading | Spur mark | Cockling | Glossiness | Smear fixability |
|---|---|---|---|---|---|---|---|
| Example 28 | Recording Paper (1) | Excellent | 5.0 | 3.0 | Good | Good | Fair |
| Example 29 | Recording Paper (2) | Excellent | 5.0 | 3.0 | Good | Fair | Good |
| Example 30 | Recording Paper (3) | Good | 5.0 | 3.0 | Fair | Fair | Good |
| Comparative Example 13 | Recording Paper (4) | Poor | 5.0 | 3.0 | Good | Poor | Good |
| Comparative Example 14 | Recording Paper (5) | unmeasurable | 1.0 | 1.0 | Excellent | unmeasurable | Poor |

Having now fully described the invention, it will be apparent to one of ordinary skill in the art that many changes and modifications can be made thereto without departing from the spirit and scope of the invention as set forth therein.

What is claimed is:

1. An image forming method, comprising:
   applying a pretreatment liquid on the surface of a recording medium; and
   applying an inkjet ink comprising a colorant, a hydrosoluble organic solvent, a surfactant and water on the surface applied with the pretreatment liquid,
   wherein the hydrosoluble organic solvent comprises:
   at least one polyol comprising an equilibrium water content in an amount not less than 30% by weight at 23° C. and 80% RH;
   an amide compound having the following formula (I); and
   at least one of compounds having the following formulae (II) to (IV),

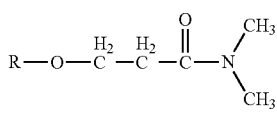
(I)

wherein R represents an alkyl group having 4 to 6 carbon atoms,

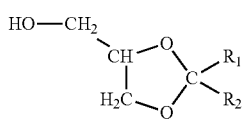
(II)

wherein $R_1$ represents a hydrogen atom or an alkyl group having 1 to 2 carbon atoms, and $R_2$ represents an alkyl group having 1 to 4 carbon atoms,

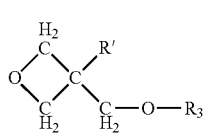
(III)

wherein R' represents an alkyl group having 1 to 2 carbon atoms; and $R_3$ represents a hydrogen atom, an alkyl group having 1 to 8 carbon atoms, a cyclic alkyl group or an aromatic ring, and

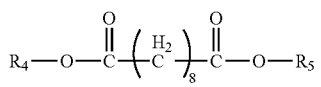
(IV)

wherein $R_4$ and $R_5$ represent an alkyl group having 1 to 8 carbon atoms, respectively, and wherein a pure water transfers to the recording medium in an amount of from 1 to 15 mL/m² when measured by a dynamic scanning liquid absorptometer at a contact time of 100 ms.

2. The image forming method of claim 1, wherein the hydrosoluble organic solvent further comprises an amino compound having the following formula (I-2):

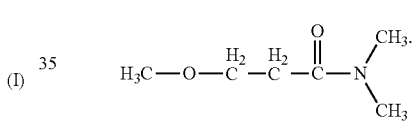
(I-2)

3. The image forming method of claim 1, wherein the pretreatment liquid comprises at least one hydrosoluble aliphatic organic acid selected from the group consisting of compounds having the following formula (V):

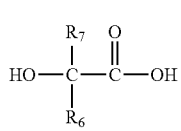
(V)

wherein $R_6$ represents a hydrogen atom or a methyl group substituted by a carboxyl group; and $R_7$ represents a methyl group, a methyl group substituted by a carboxyl group, or a methyl group substituted by a hydroxyl group and a carboxyl group.

4. The image forming method of claim 3, wherein the pretreatment liquid further comprises a hydrosoluble organic monoamine compound.

5. The image forming method of claim 4, wherein the hydrosoluble organic monoamine compound is a member selected from the group consisting of compounds having the formula (VI) and (VII):

(VI)

wherein $R^8$, $R^9$, and $R^{10}$ independently represent a hydrogen atom, an alkoxy group having 1 to 4 carbon atoms, an alkyl group having 1 to 8 carbon atoms, a hydroxyethyl group or a hydroxypropyl group, excluding a case where all of $R^8$, $R^9$, and $R^{10}$ are hydrogen atoms;

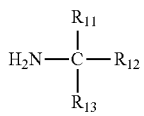
(VII)

wherein $R^{11}$ represents a hydroxymethyl group; $R^{12}$ represents a methyl group, an ethyl group or a hydroxymethyl group; and $R^{13}$ denotes a hydrogen atom, an alkyl group having 1 to 4 carbon atoms or a hydroxymethyl group.

6. The image forming method of claim 1, wherein the pretreatment liquid further comprises at least one of ammonium lactate and a hydrosoluble cationic polymer.

7. The image forming method of claim 6, wherein the hydrosoluble cationic polymer is a member selected from the group consisting of copolymers having the following formula (VIII), copolymers having a repeating unit having the following formula (IX), and copolymers obtained by polymerizing an amine monomer having the following formula (X), a monomer having the following formula (XI) and a monomer having the following formula (XII):

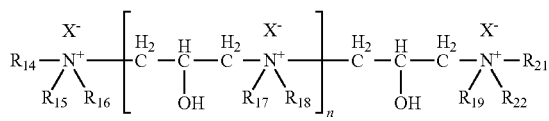
(VIII)

wherein $R_{14}$ to $R_{21}$ may be identical to or different from each other, and each represents at least one of an alkyl group having 1 to 8 carbon atoms, a hydroxyalkyl group, an alkenyl group, and a benzyl group; X represents a halogen atom; and n represents an integer of from 1 o to 4;

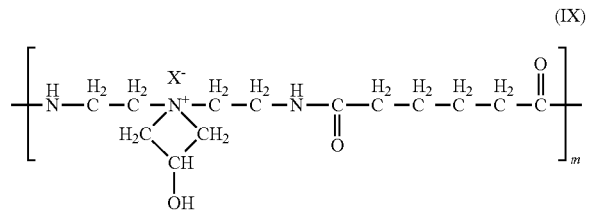
(IX)

wherein X represents a halogen atom and m represents an integer of 1 or more;

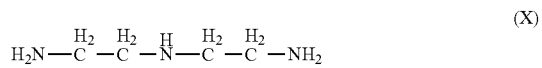
(X)

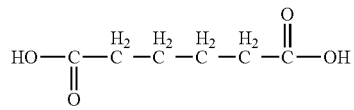
(XI)

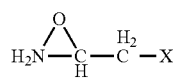
(XII)

wherein X represents a halogen atom.

8. The image forming method of claim 1, wherein the colorant is at least one pigment selected from the group consisting of anionic self-dispersible pigments, pigments coated with an anionic resin and aqueous pigments dispersed with an anionic dispersant or a nonionic dispersant.

9. The image forming method of claim 1, wherein the recording medium comprises:
   a substrate; and
   a layer coated on at least one side of the substrate,
   wherein a pure water transfers to the layer in an amount of from 1 to 15 mL/m² when measured by a dynamic scanning liquid absorptometer at a contact time of 100 ms.

* * * * *